US010682870B2

(12) United States Patent
Tobita et al.

(10) Patent No.: US 10,682,870 B2
(45) Date of Patent: Jun. 16, 2020

(54) CONVEYED OBJECT DETECTOR, CONVEYANCE DEVICE, DEVICE INCLUDING MOVABLE HEAD, CONVEYED OBJECT DETECTING METHOD, AND NON-TRANSITORY RECORDING MEDIUM STORING PROGRAM OF SAME

(71) Applicants: Katsuhiro Tobita, Kanagawa (JP); Koichi Kudo, Kanagawa (JP)

(72) Inventors: Katsuhiro Tobita, Kanagawa (JP); Koichi Kudo, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 25 days.

(21) Appl. No.: 15/617,224

(22) Filed: Jun. 8, 2017

(65) Prior Publication Data

US 2017/0355205 A1 Dec. 14, 2017

(30) Foreign Application Priority Data

Jun. 9, 2016 (JP) .................................. 2016-115164
Jun. 6, 2017 (JP) .................................. 2017-111347

(51) Int. Cl.
*B41J 11/00* (2006.01)
*G06T 7/246* (2017.01)
(Continued)

(52) U.S. Cl.
CPC ......... *B41J 11/0095* (2013.01); *G06T 7/0004* (2013.01); *G06T 7/246* (2017.01);
(Continued)

(58) Field of Classification Search
CPC ............................ G01N 21/86; B41J 11/0095
See application file for complete search history.

(56) References Cited

U.S. PATENT DOCUMENTS

2006/0115177 A1* 6/2006 Ishiga .................. H04N 1/4097
382/275
2009/0213249 A1* 8/2009 Ikeda .................... H04N 5/3572
348/241

(Continued)

FOREIGN PATENT DOCUMENTS

JP 2011-136526 7/2011
JP 2014-035197 2/2014

OTHER PUBLICATIONS

U.S. Appl. No. 15/373,807, filed Dec. 9, 2016.
(Continued)

*Primary Examiner* — Justin Seo
(74) *Attorney, Agent, or Firm* — Harness, Dickey & Pierce, P.L.C.

(57) ABSTRACT

A conveyed object detector includes first and second image obtaining units disposed at first and second positions different in a conveyance direction, to image a conveyed object to obtain first and second image data; respectively; a recognition unit to recognize an object adhering to the first and second image obtaining units based on imaging at the first and second positions to generate first and second stain data, respectively; a removal unit to remove the first and second stain data from the first and second image data, respectively; and a calculator to generate at least one of a position, a movement amount, and a moving speed of the conveyed object based on first and second corrected image data. Each of the first and second image obtaining units include a light source, an area sensor, and an optical element disposed between the area sensor and the conveyed object.

16 Claims, 22 Drawing Sheets

(51) Int. Cl.
  *G06T 7/292* (2017.01)
  *G06T 7/00* (2017.01)
(52) U.S. Cl.
  CPC .... *G06T 7/292* (2017.01); *G06T 2207/10016* (2013.01); *G06T 2207/10024* (2013.01); *G06T 2207/30144* (2013.01); *G06T 2207/30176* (2013.01)

(56) References Cited

U.S. PATENT DOCUMENTS

| | | | |
|---|---|---|---|
| 2009/0303339 A1* | 12/2009 | Kudo | H04N 5/2171 348/222.1 |
| 2010/0073492 A1* | 3/2010 | Kudo | H04N 5/2171 348/208.1 |
| 2010/0310284 A1 | 12/2010 | Funato et al. | |
| 2014/0044460 A1 | 2/2014 | Kudo et al. | |
| 2014/0219670 A1 | 8/2014 | Masuda et al. | |
| 2014/0268180 A1 | 9/2014 | Takaura et al. | |
| 2015/0009262 A1 | 1/2015 | Bell et al. | |
| 2016/0114576 A1 | 4/2016 | Tobita | |
| 2016/0121602 A1 | 5/2016 | Nagasu et al. | |
| 2016/0136947 A1 | 5/2016 | Hommi | |
| 2016/0347050 A1 | 12/2016 | Hommi | |
| 2017/0106647 A1 | 4/2017 | Inoue | |

OTHER PUBLICATIONS

U.S. Appl. No. 15/373,825, filed Dec. 9, 2016.
U.S. Appl. No. 15/382,963, filed Dec. 19, 2016.
U.S. Appl. No. 15/455,539, filed Mar. 10, 2017.
U.S. Appl. No. 15/456,677, filed Mar. 13, 2017.

* cited by examiner

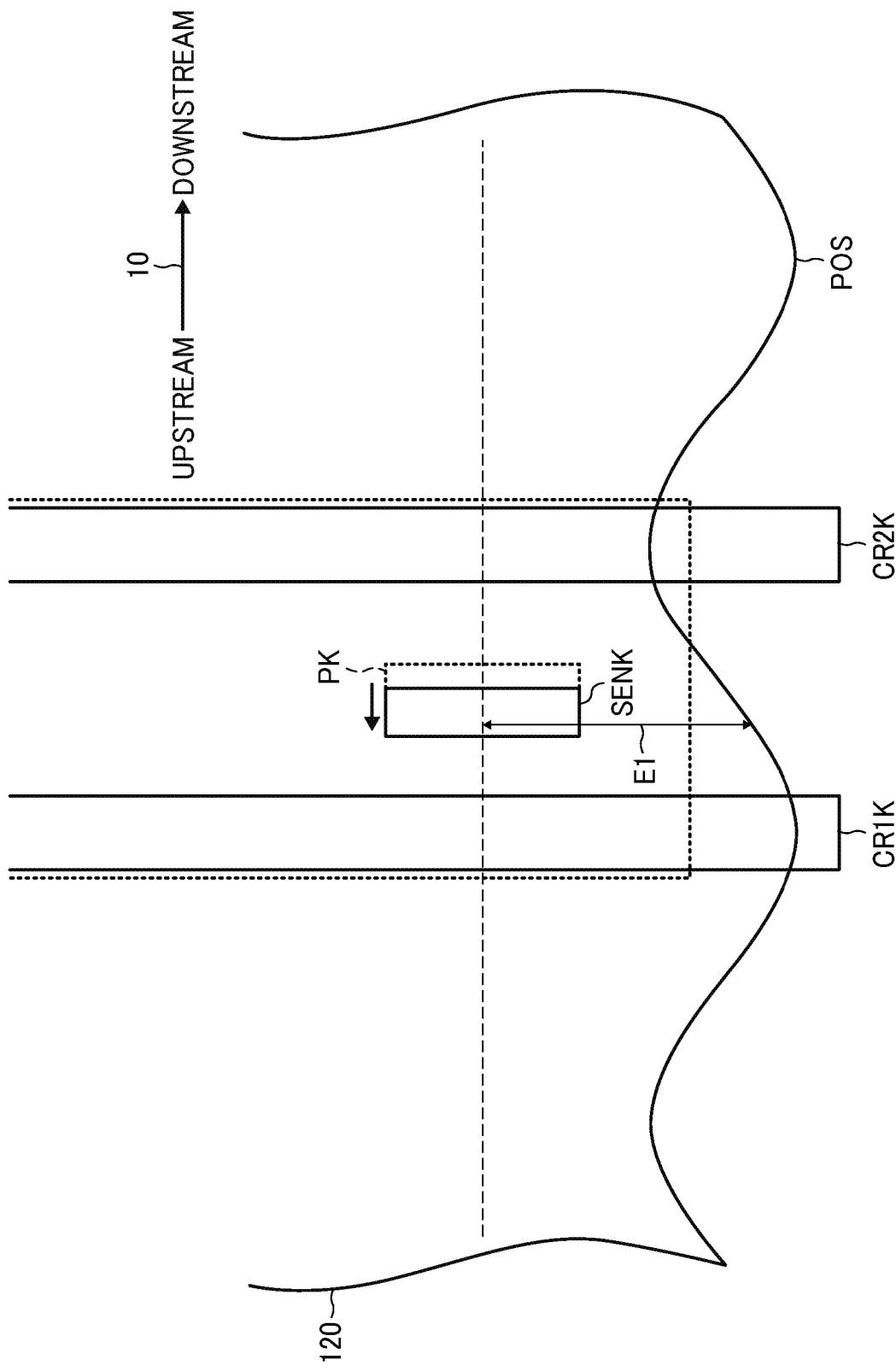

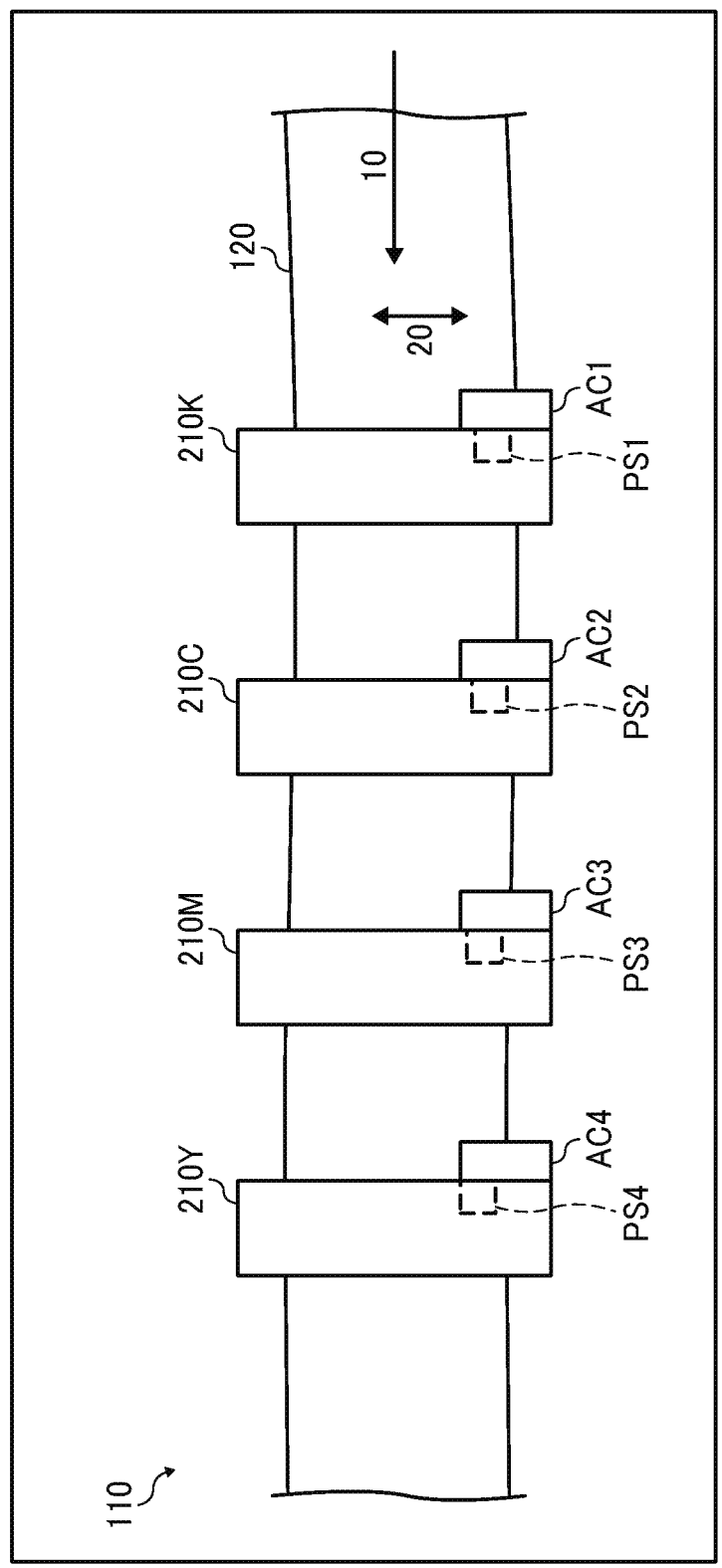

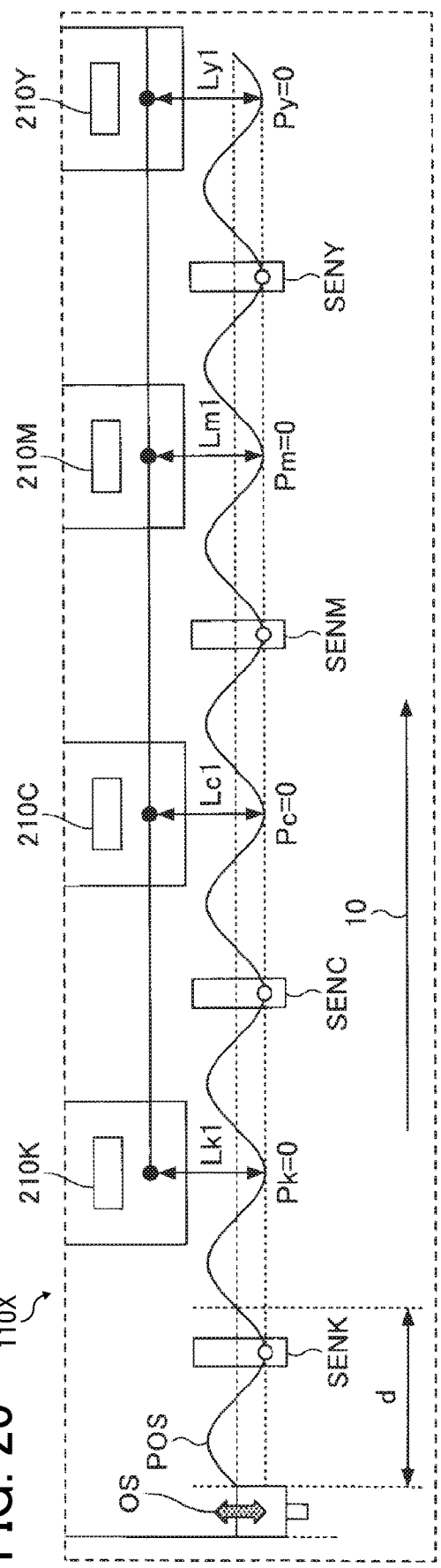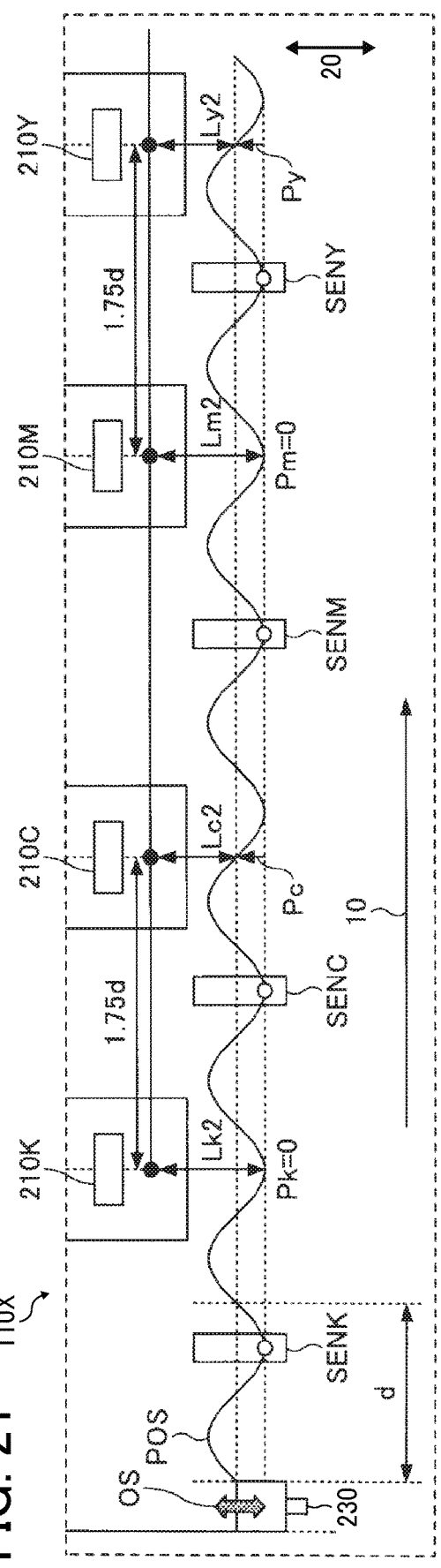

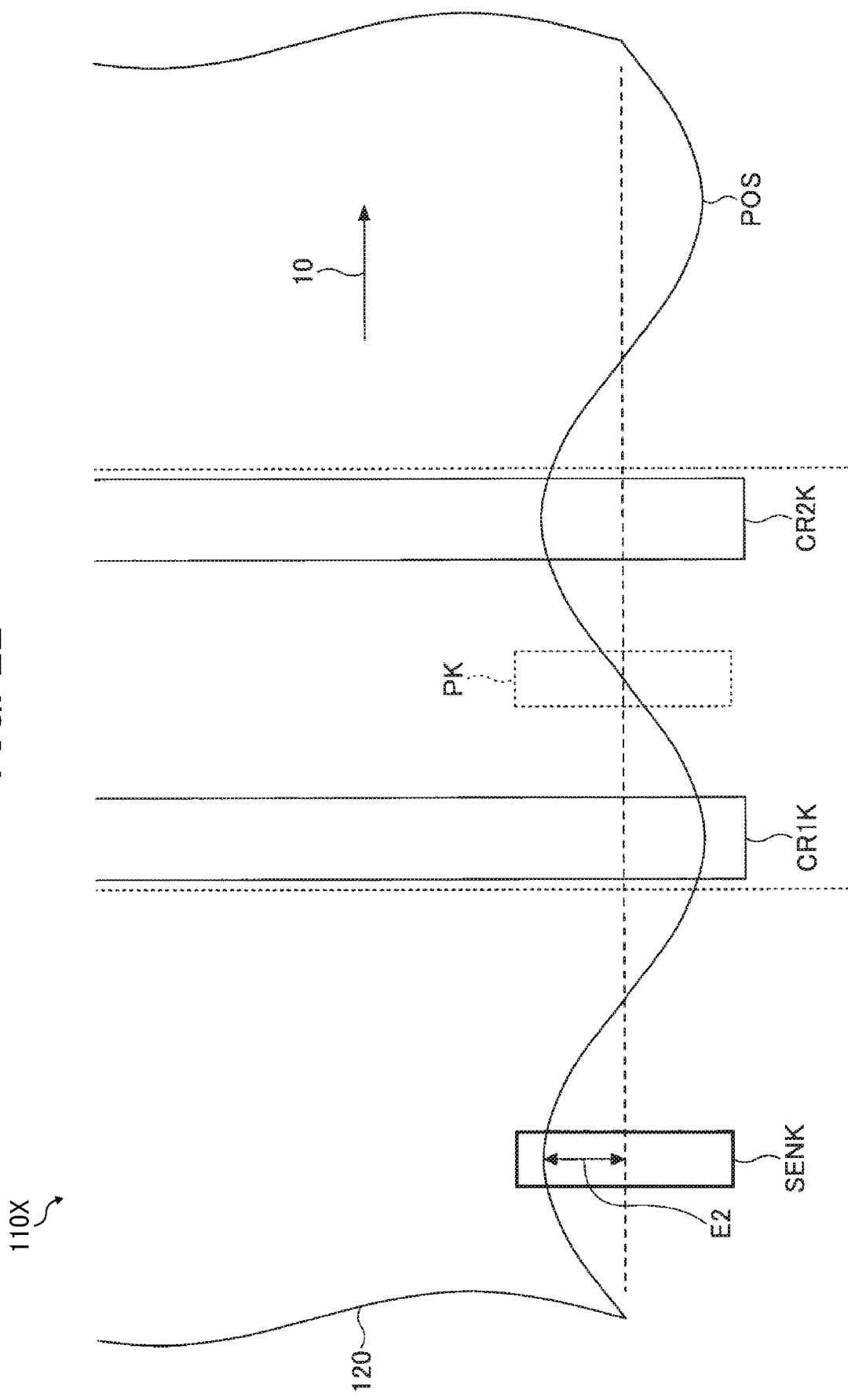

CONVEYED OBJECT DETECTOR, CONVEYANCE DEVICE, DEVICE INCLUDING MOVABLE HEAD, CONVEYED OBJECT DETECTING METHOD, AND NON-TRANSITORY RECORDING MEDIUM STORING PROGRAM OF SAME

CROSS-REFERENCE TO RELATED APPLICATIONS

This patent application is based on and claims priority pursuant to 35 U.S.C. § 119(a) to Japanese Patent Application Nos. 2016-115164, filed on Jun. 9, 2016, and 2017-111347, filed on Jun. 6, 2017, in the Japan Patent Office, the entire disclosure of which is hereby incorporated by reference herein.

BACKGROUND

Technical Field

Embodiments of the present disclosure relate to a conveyed object detector, a conveyance device, an apparatus including a movable head to perform an operation on a conveyed object, a conveyed object detecting method, and a recording medium storing a program of the method.

Description of the Related Art

There are various types of operation using a movable head unit. For example, there are image forming methods that include discharging ink from a print head (so-called inkjet).

In such image forming methods, the position of the print head is adjusted to improve image quality.

SUMMARY

According to an aspect of this disclosure, a conveyed object detector includes a first image obtaining unit disposed at a first position to image a conveyed object to obtain first image data; a second image obtaining unit disposed at a second position different from the first position in a conveyance direction of the conveyed object. The second image obtaining unit is configured to image the conveyed object to obtain second image data. Each of the first image obtaining unit and the second image obtaining unit includes a light source to irradiate the conveyed object with light, an area sensor to receive reflected light reflected from the conveyed object, and an optical element disposed between the area sensor and the conveyed object. The conveyed object detector further includes a recognition unit configured to recognize an object adhering to the first image obtaining unit based on imaging at the first position to generate first stain data, and recognize an object adhering to the second image obtaining unit based imaging at the second position, to generate second stain data. The conveyed object detector further includes a removal unit configured to remove the first stain data from the first image data, to generate first corrected image data, and remove the second stain data from the second image data to generate second corrected image data. The conveyed object detector further includes a calculator configured to generate, as a calculation result, at least one of a position, a movement amount, and a moving speed of the conveyed object based on the first corrected image data and the second corrected image data.

In another aspect, a conveyance device includes a conveyance device to convey the conveyed object and the conveyed object detector described above.

Another aspect provides an apparatus including a head unit to move in an orthogonal direction orthogonal to the conveyance direction and perform an operation on the conveyed object. The device further includes the conveyance device described above and a head controller to control the head unit, based on a detection result generated by the conveyed object detector.

Another aspect provides a conveyed object detector including image obtaining means for imaging a conveyed object at a first position and a second position to obtain first image data and second image data, respectively. The second position is different from the first position in a conveyance direction of the conveyed object. The conveyed object detector further includes recognition means for recognizing an adhering object included in imaging at the first position to generate first stain data, and an adhering object included in imaging at the second position to generate second stain data. The conveyed object detector further includes removal means for removing the first stain data from the first image data to generate first corrected image data and removing the second stain data from the second image data to generate second corrected image data. The conveyed object detector further includes calculating means for generating, as a calculation result, at least one of a position, a movement amount, and a moving speed of the conveyed object based on the first corrected image data and the second corrected image data.

Another aspect provides a conveyed object detecting method that includes imaging, with a first area sensor and a second area sensor, a conveyed object at a first position and a second position to obtain first image data and second image data, respectively. The second position is different from the first position in a conveyance direction of the conveyed object. The method further includes recognizing an object adhering to the first area sensor based on imaging at the first position, to generate first stain data, and recognizing an object adhering to the second area sensor based imaging at the second position, to generate second stain data. The method further includes removing the first stain data from the first image data, to generate first corrected image data, removing the second stain data from the second image data, to generate second corrected image data; and generating, as a calculation result, at least one of a position, a movement amount, and a moving speed of the conveyed object based on the first corrected image data and the second corrected image data.

Another aspect provides a computer-readable non-transitory recording medium storing a program for causing a computer to execute the method described above.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 17 is a plan view illustrating a location of the sensor unit according to an embodiment;

FIG. 18 is a plan view illustrating arrangement of the sensor units according to an embodiment;

FIG. 20 is a schematic diagram illustrating operation of the image forming apparatus according to Comparative example 1;

FIG. 21 is a schematic diagram illustrating operation of the image forming apparatus according to Comparative example 2;

FIG. 22 illustrates an example location of a sensor unit in the image forming apparatus illustrated in FIG. 21;

Figure 1:
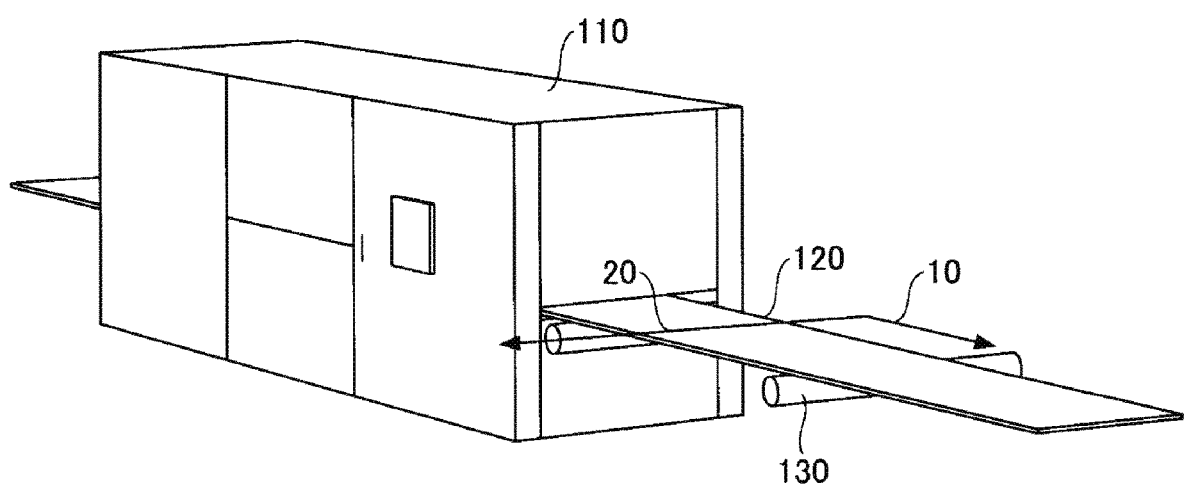
FIG. 1 is a schematic view of an image forming apparatus as a liquid discharge apparatus according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, and particularly to FIG. 1, an image forming apparatus according to an embodiment of the present invention is described. As used herein, the singular forms "a", "an", and "the" are intended to include the plural forms as well, unless the context clearly indicates otherwise.

In the embodiment described below, a liquid discharge head unit is one example of a movable head, and a liquid discharge apparatus is one example of an apparatus including the movable head.

FIG. 1 is a schematic view of an image forming apparatus, serving as a liquid discharge apparatus, according to an embodiment. In FIG. 1, an image forming apparatus 110 discharges a recording liquid such as aqueous ink or oil-based ink. Additionally, the image forming apparatus 110 is an example of a conveyance device to convey a conveyed object such as a recording medium.

In this example, the conveyed object is a web 120. In the illustrated example, the image forming apparatus 110 includes a roller 130 and the like to convey the web 120, serving as a recording medium, and discharges liquid onto the web 120 to form an image thereon. The web 120 is a so-called continuous sheet. That is, the web 120 is, for example, paper in the form of roll that can be reeled. The image forming apparatus 110 is a so-called production printer. The description below concerns an example in which the roller 130 adjusts the tension of the web 120 and conveys the web 120 in a conveyance direction 10. Hereinafter, unless otherwise specified, "upstream" and "downstream" mean those in the conveyance direction 10. A direction orthogonal to the conveyance direction 10 is referred to as an orthogonal direction 20. In the illustrated example, the image forming apparatus 110 is an inkjet printer to discharge four color inks, namely, black (K), cyan (C), magenta (M), and yellow (Y) inks, to form an image on the web 120.

Note that the suffixes K, C, M, and K attached to each reference numeral indicate that components indicated thereby are used for forming black, cyan, magenta, and yellow, images, respectively, and hereinafter may be omitted when color discrimination is not necessary.

Figure 2:
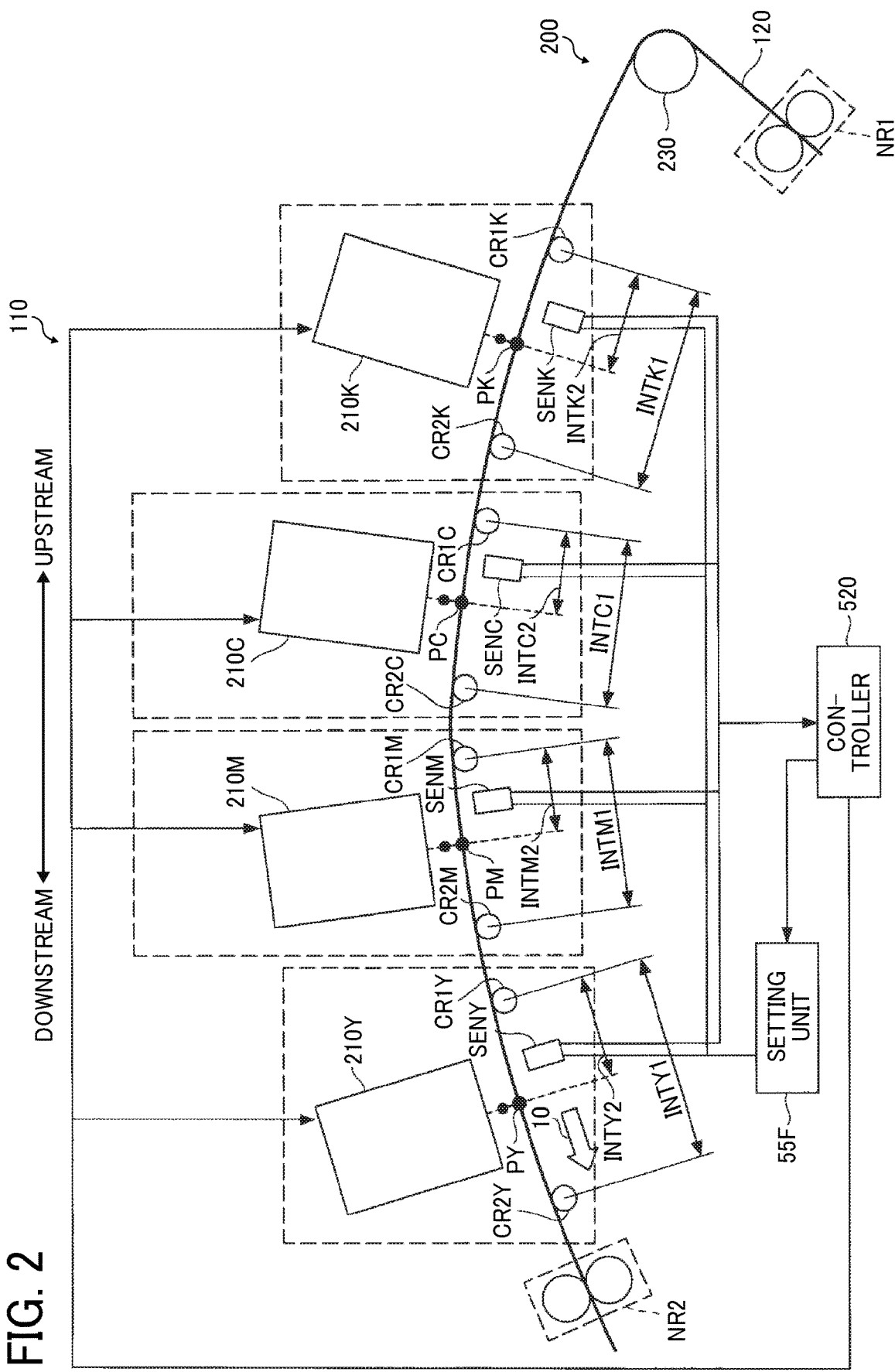
FIG. 2 is a schematic view illustrating a general structure of the image forming apparatus illustrated in FIG. 1.

FIG. 2 is a schematic view of the image forming apparatus 110. As illustrated in FIG. 2, the image forming apparatus 110 includes four liquid discharge head units 210 (210K, 210C, 210M, and 210Y) to discharge the four inks, respectively.

Each liquid discharge head unit 210 discharges the ink onto the web 120 conveyed in the conveyance direction 10. The image forming apparatus 110 includes two pairs of nip rollers, a roller 230 (e.g., a driving roller), and the like, to convey the web 120. One of the two pairs of nip rollers is a first nip roller pair NR1 disposed upstream from the liquid discharge head units in the conveyance direction 10. The other is a second nip roller pair NR2 disposed downstream from the first nip roller pair NR1 and the liquid discharge head units in the conveyance direction 10. Each nip roller pair rotates while nipping the conveyed object, such as the web 120, as illustrated in FIG. 2. The nip roller pairs and the roller 230 as conveyors convey the conveyed object (e.g., the web 120) in a predetermined direction.

The web 120 is a long sheet of recording media. Specifically, the recording medium is preferably longer than the distance between the first nip roller pair NR1 and the second nip roller pair NR2. The recording medium is not limited to webs. For example, the recording medium may be a folded sheet (so-called fanfold paper or Z-fold paper).

In the structure illustrated in FIG. 2, the liquid discharge head units 210 are arranged in the order of black, cyan, magenta, and yellow in the conveyance direction 10. Specifically, the liquid discharge head unit 210K for black is disposed extreme upstream, and the liquid discharge head unit 210C for cyan is disposed next to and downstream from the liquid discharge head unit 210K. Further, the liquid discharge head unit 210M for magenta is disposed next to and downstream from the liquid discharge head unit 210C for cyan, and the liquid discharge head unit 210Y for yellow is disposed extreme downstream in the conveyance direction 10.

Each liquid discharge head unit 210 discharges ink droplets so that the ink droplets strike a predetermined position on the web 120, according to image data. The position at which the liquid discharge head unit 210 discharges ink (hereinafter "ink discharge position") is almost identical to the position at which ink droplets discharged from the liquid discharge head (e.g., 210K-1, 210K-2, 210K-3, or 210K-4 in FIG. 3A) strike the surface of the recording medium. In other words, the ink discharge position can be directly below the liquid discharge head. In the present embodiment, black ink is discharged to the ink discharge position of the liquid discharge head unit 210K (hereinafter "black ink discharge position PK"). Similarly, cyan ink is discharged to the ink discharge position of the liquid discharge head unit 210C (hereinafter "cyan ink discharge position PC"). Magenta ink is discharged to the ink discharge position of the liquid discharge head unit 210M (hereinafter "magenta ink discharge position PM"). Yellow ink is discharged to the ink discharge position of the liquid discharge head unit 210Y (hereinafter "yellow ink discharge position PY"). Note that a controller 520 operably connected to the liquid discharge head units 210 controls the respective timings at which the liquid discharge head units 210 discharge ink.

In the description below, the ink discharge position serves as an operation position of the liquid discharge head unit.

Each liquid discharge head unit 210 is provided with a plurality of rollers. As illustrated in the drawings, for example, the image forming apparatus 110 includes the rollers respectively disposed upstream and downstream from each liquid discharge head unit 210. In the illustrated example, a first roller CR1, serving as a first support, is disposed upstream from each liquid discharge head unit 210 to convey the web 120 to the ink discharge position. Similarly, a second roller CR2, serving as a second support, is disposed downstream from each liquid discharge head unit 210 to convey the web 120 from the ink discharge position. Disposing the first roller CR1 and the second roller CR2 for each ink discharge position can suppress fluttering of the recording medium conveyed. For example, the first roller CR1 and the second roller CR2 used to convey the recording medium are driven rollers. Alternatively, the first roller CR1 and the second roller CR2 may be driven by a motor or the like.

Note that, instead of the first and second roller CR1 and CR2 that are rotators such as driven rollers, first and second supports to support the conveyed object may be used. For example, each of the first and second supports can be a pipe or a shaft having a round cross section. Alternatively, each of the first and second supports can be a curved plate having a curved face to contact the conveyed object. In the description below, the first and second supporters are rollers.

Specifically, a first roller CR1K, disposed upstream from the liquid discharge head unit 210K, conveys the web 120 to the black ink discharge position PK so that black ink is applied to a specific portion of the web 120. A second roller CR2K conveys the web 120 from the black ink discharge position PK to the downstream side. Similarly, a first roller CR1C and a second roller CR2C are disposed upstream and downstream from the liquid discharge head unit 210C for cyan, respectively. Similarly, a first roller CR1M and a second roller CR2M are disposed upstream and downstream from the liquid discharge head unit 210M, respectively. Similarly, a first roller CR1Y and a second roller CR2Y are disposed upstream and downstream from the liquid discharge head unit 210Y, respectively.

Figure 3A:
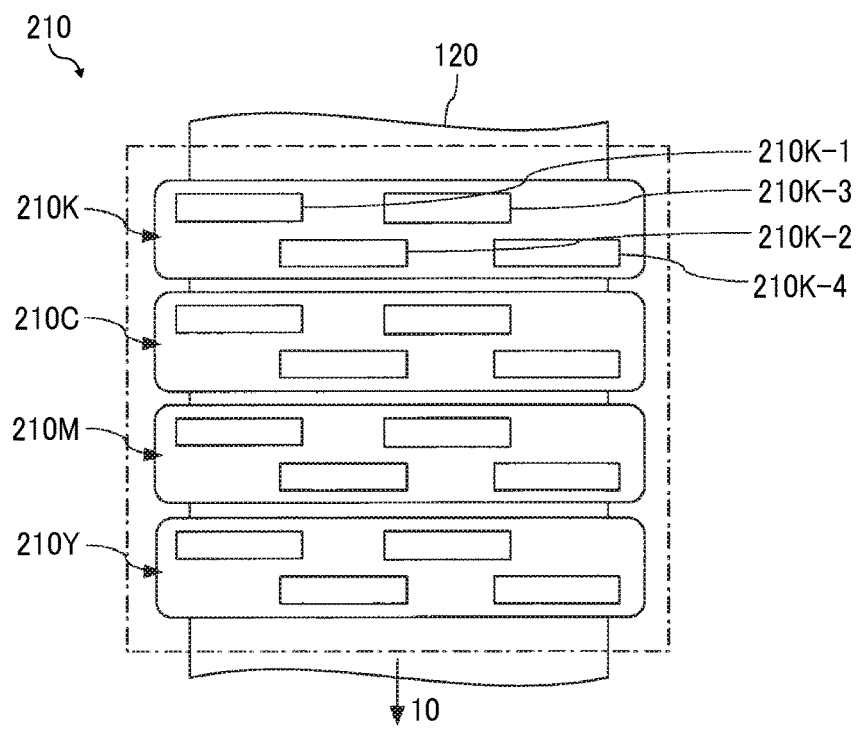
FIG. 3A is a schematic view illustrating an external shape of a liquid discharge head unit of the image forming apparatus illustrated in FIG. 2.
Figure 3B:
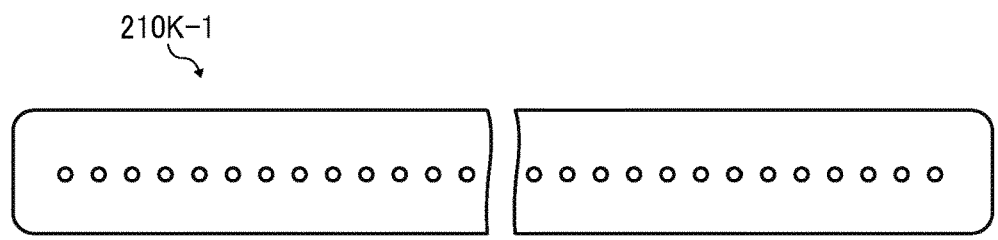
FIG. 3B is a schematic view of a liquid discharge head of the liquid discharge head unit illustrated in FIG. 3A.

An example outer shape of the liquid discharge head unit 210 is described below with reference to FIGS. 3A and 3B. FIG. 3A is a schematic plan view of one of the four liquid discharge head units 210K, 210C, 210M, and 210Y of the image forming apparatus 110.

As illustrated in FIG. 3A, the liquid discharge head unit 210 according to the present embodiment is a line-type head unit. That is, the image forming apparatus 110 includes the four liquid discharge head units 210K, 210C, 210M, and 210Y arranged in the order of black, cyan, magenta, and yellow in the conveyance direction 10.

The liquid discharge head unit 210K includes four heads 210K-1, 210K-2, 210K-3, and 210K-4 arranged in a staggered manner in the orthogonal direction 20 orthogonal to the conveyance direction 10 in which the web 120 is conveyed. With this arrangement, the image forming apparatus 110 can form an image across the image formation area in the width direction orthogonal to the conveyance direction 10. The liquid discharge head units 210C, 210M, and 210Y are similar in structure to the liquid discharge head unit 210K, and the descriptions thereof are omitted to avoid redundancy.

Although the liquid discharge head unit 210 includes the four heads in the description above, alternatively, the liquid discharge head unit 210 may be constructed of a single head.

[Sensor]

The image forming apparatus 110 includes, for each liquid discharge head unit 210, a sensor unit SEN to detect the surface of the recording medium in the conveyance direction 10 or the orthogonal direction 20. Usable as the sensor unit SEN are a sensor employing laser, air pressure, photoelectric, or ultrasonic; and an optical sensor employing light such as infrared. For example, the optical sensor is a charge-coupled device (CCD) camera or a complementary metal oxide semiconductor (CMOS) camera. The sensor unit SEN serving as an image obtaining unit is a sensor to detect a surface of the recording medium during image formation, thereby detecting at least one of the position, speed, the amount of movement of the recording medium.

As illustrated in FIG. 2, a setting unit 55F is coupled to the sensor unit SEN. The setting unit 55F sets an aperture relating to the sensor, exposure time, and the like based on computation result of the sensor or the controller 520. The setting is described in further detail later.

Figure 4:
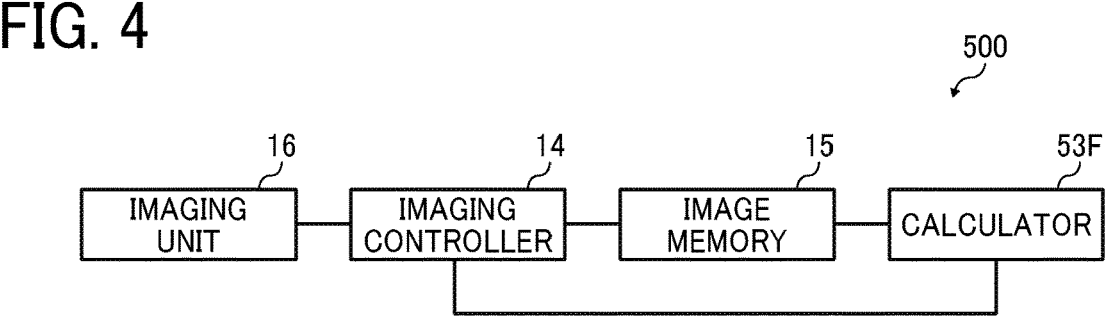
FIG. 4 is a schematic block diagram illustrating a configuration of a conveyed object detector of the image forming apparatus illustrated in FIG. 2.

FIG. 4 is a schematic block diagram illustrating a configuration of a conveyed object detector 500 according to an embodiment. For example, the conveyed object detector 500 includes an imaging unit 16, an imaging controller 14, an image memory 15, and a calculator 53F. The imaging unit 16, the imaging controller 14, the image memory 15 together forms an image obtaining unit 52 (e.g., 52A or 52B in FIG. 6) to image the conveyed object and generate image data thereof.

The imaging unit 16 is implemented by the following structure.

Figure 5:
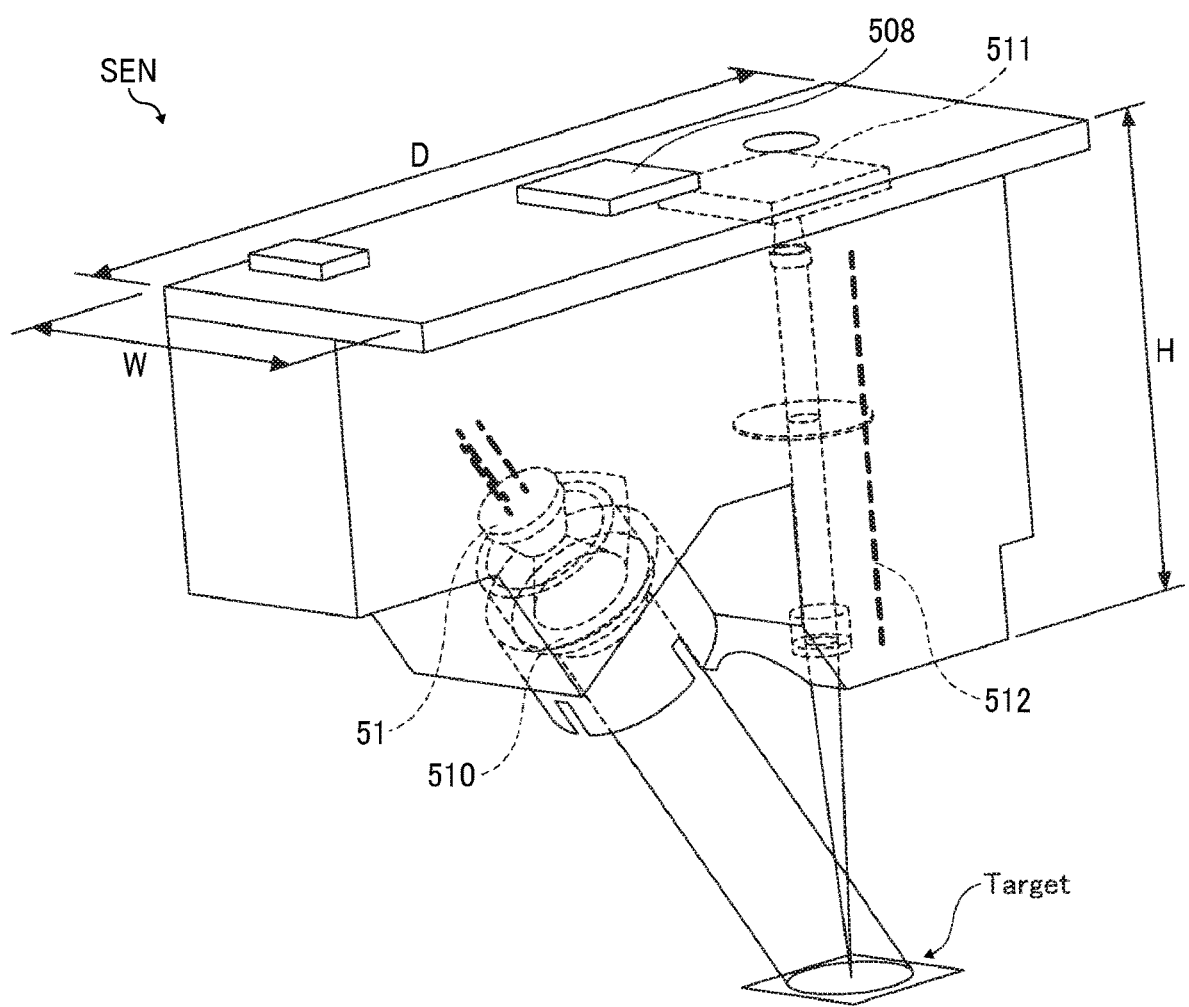
FIG. 5 is an external view of a sensor unit of conveyed object detector illustrated in FIG. 4.

FIG. 5 is an external view of the sensor unit SEN functioning as the imaging unit 16. The sensor unit SEN illustrated in FIG. 5 is configured to capture a speckle pattern, which appears on a conveyed object (i.e., a target in FIG. 5) such as a recording media when the conveyed object is irradiated with light. Specifically, the sensor unit SEN includes a light source 51 such as semiconductor laser light source (e.g., a laser diode or LD) and an optical element such as a collimate optical system 510. To obtain an image having a speckle pattern, the sensor unit SEN further includes a complementary metal oxide semiconductor (CMOS) image sensor 511 and a telecentric optical system 512 to condense light to image the speckle pattern on the CMOS image sensor 511. The telecentric optical system 512 is disposed between the image sensor 511 serving as an area sensor and the conveyed object (i.e., a target in FIG. 5).

In the structure illustrated in FIG. 5, the CMOS image sensor 511 captures the image having the speckle pattern at multiple times, at a time TM1 (a first time point) and a time TM2 (a second time point). Based on the imaging at the time TM1 and the imaging at the time TM2, a calculator 53F of the controller 520 performs cross-correlation operation and the like. The calculator 53F may be implemented by a field-programmable gate array (FPGA) circuit 508. Alternatively, the calculator 53F is implemented by the controller 520 of the image forming apparatus 110. Based on a displacement of a correlation peak position calculated by the correlation operation or the like, the conveyed object detector 500 outputs the amount of movement of the conveyed object (e.g., the recording medium) from the time TM1 to the time TM2. In the illustrated example, the sensor unit SEN has a width W of 15 mm, a depth D of 60 mm, and a height H of 32 mm (15×60×32). The correlation operation is described in detail later.

Figure 6:
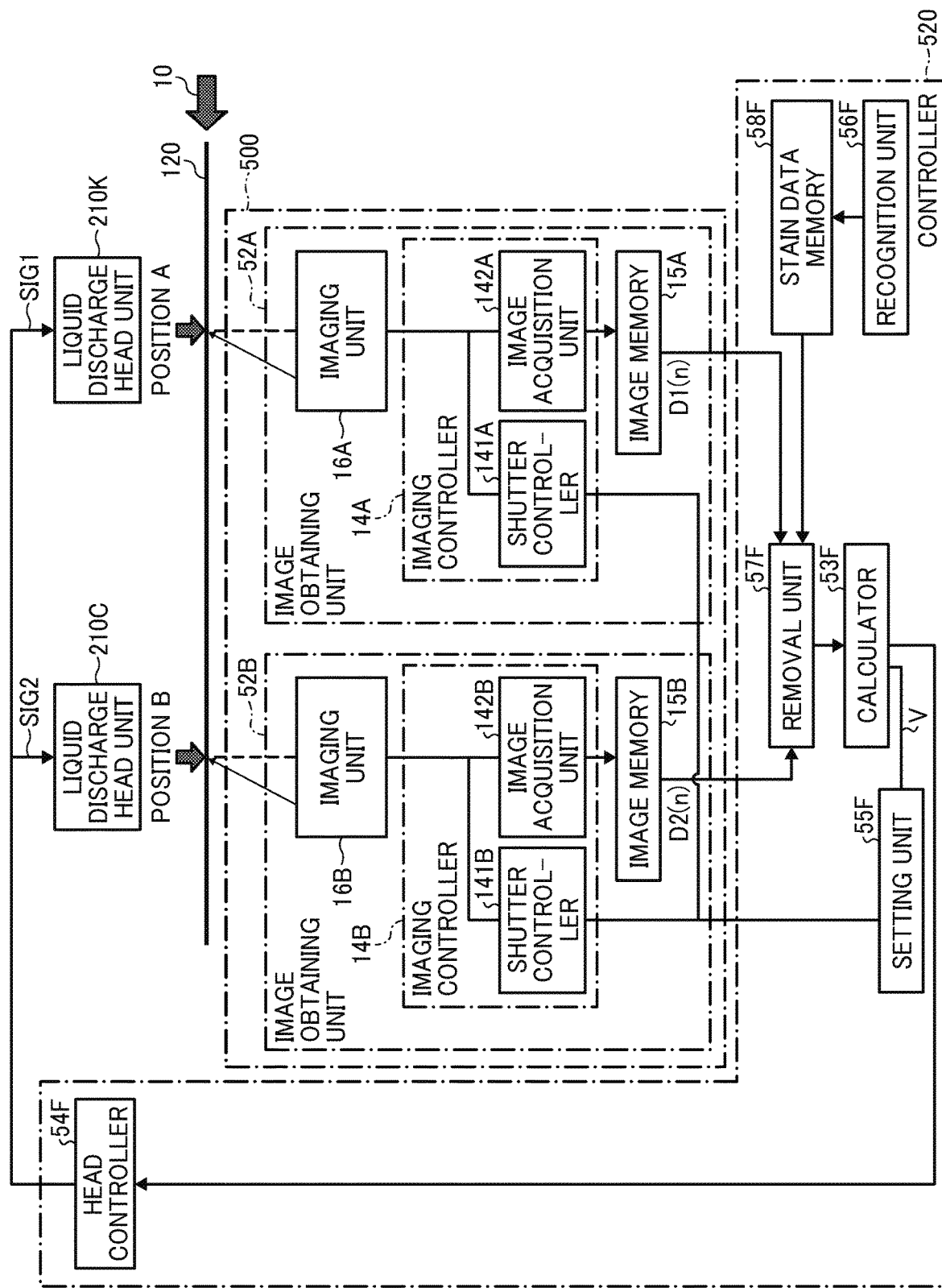
FIG. 6 is a schematic block diagram of a functional configuration of the conveyed object detector illustrated in FIG. 4.

The CMOS image sensor 511 is an example hardware structure to implement the imaging unit 16 constructing an image obtaining unit 52 (52A and 52B in FIG. 6). The FPGA circuit 508 is an example hardware structure of the imaging controller 14 and image memory 15.

Referring back to FIG. 4, the imaging controller 14 controls the imaging unit 16 and the like. Specifically, for example, the imaging controller 14 outputs trigger signals to the imaging unit 16 to control the timing of shooting (shutter timing) of the CMOS image sensor 511. The imaging controller 14 causes the imaging unit 16 to generate the two-dimensional images and acquires the two-dimensional images therefrom. Then, the imaging controller 14 transmits the two-dimensional images generated by the imaging unit 16 to the image memory 15.

The image memory 15 is a so-called memory. The image memory 15 preferably has a capability to divide the two-dimensional images transmitted from the imaging controller 14 or the like and store the divided images in different memory ranges.

For example, the calculator 53F is a microcomputer. The calculator 53F performs operations using the image data stored in the image memory 15 and the like, to implement a variety of processing.

The imaging controller 14 and the calculator 53F are, for example, central processing units (CPUs) or electronic circuits. Note that the imaging controller 14, the image memory 15, and the calculator 53F are not necessarily discrete devices. For example, the imaging controller 14 and the calculator 53F can be implemented by a single CPU.

The conveyed object detector 500 is described in further detail below, using an example including two optical systems identical to the optical system illustrated in FIG. 5. The number of the optical systems is not limited to two but can be one or greater than two. Each optical system may have a diaphragm, such as, a motorized iris diaphragm. The diaphragm is controlled by an actuator or the like to adjust the amount of light received. Alternatively, shutter speed or the like may be controlled to adjust exposure time. For example, the imaging controller 14 performs control processing, and the setting unit 55F sets the aperture and the like.

FIG. 6 is a schematic block diagram of a functional configuration of the conveyed object detector 500 according to an embodiment. As described above, the image obtaining unit 52 (implemented by the sensor unit SEN) is provided for each of the liquid discharge head units 210. In the present embodiment, the amount of movement of the conveyed object and the like are calculated based on two of the sensor units SEN. Descriptions below are based on a combination of black and cyan. In this example, as illustrated in FIG. 6, the image obtaining unit 52A for the liquid discharge head unit 210K outputs a detection result concerning the position A, and the image obtaining unit 52B for the liquid discharge head unit 210C outputs a detection result concerning the position B. The image obtaining unit 52A for the liquid discharge head unit 210K includes, for example, an imaging unit 16A, an imaging controller 14A, and an image memory 15A. In this example, the image obtaining unit 52B for the liquid discharge head unit 210C is similar in configuration to the image obtaining unit 52A. The image obtaining unit 52B includes an imaging unit 16B, an imaging controller 14B, and an image memory 15B. The image obtaining unit 52A is described below.

As illustrated in FIG. 6, the imaging unit 16A captures an image of the web 120 conveyed in the conveyance direction 10. The imaging unit 16A is implemented by the CMOS image sensor 511 (illustrated in FIG. 5).

The imaging controller 14A includes an image acquisition unit 142A. The imaging controller 14A is implemented by, for example, a CPU, electric circuitry, and the like.

The image acquisition unit 142A captures the image generated by the imaging unit 16A.

The imaging controller 14A may include a shutter controller 141A and the like. The shutter controller 141A controls the timing of imaging by the imaging unit 16A. In the example described below, the imaging controller 14A includes the shutter controller 141A.

The image memory 15A (implemented by a so-called memory) stores the image data captured by the imaging controller 14A.

The calculator 53F calculates, based on data of the image data recorded in the image memories 15A and 15B, the position of a pattern on the web 120, the speed at which the web 120 moves (hereinafter "moving speed"), and the amount of movement of the web 120. Additionally, the calculator 53F outputs, to the shutter controller 141A, data on time difference $\Delta t$ indicating the timing of shooting (shutter timing). In other words, the calculator 53F instructs the shutter controller 141A of shutter timings of imaging at the position A and imaging at the position B with the time difference Δt. The calculator 53F may also control the motor and the like to convey the web 120 at the calculated moving speed. The calculator 53F can be implemented by a CPU or an electronic circuit.

The web 120 has diffusiveness on a surface thereof or in an interior thereof. Accordingly, when the web 120 is irradiated with laser light, the reflected light is diffused. The diffuse reflection represents a pattern on the web 120. The pattern is made of spots called "speckle" (i.e., a speckle pattern). Accordingly, when the web 120 is imaged, an image of the speckle pattern is obtained. From the image, the position of the speckle image can be known, and the location of a specific portion of the web 120 can be detected. Such a speckle is generated as the laser light emitted to the web 120 interferes with a rugged shape on the surface of or inside the web 120.

As the web 120 is conveyed, the speckle pattern on the web 120 is conveyed as well. When an identical speckle pattern is detected at different time points, the amount of movement of the speckle pattern is obtained. In other words, the calculator 53F obtains the amount of movement of the speckle pattern based on the detection of an identical speckle pattern, thereby obtaining the amount of movement of the web 120. Further, the calculator 53F converts the calculated amount of movement into an amount of movement per unit time, thereby obtain the moving speed of the web 120.

The time difference Δt can be expressed by Formula 1, where V represents the moving speed (mm/s), and L represents a relative distance, which is the distance (mm) between a first imaging lens 12A and a second imaging lens 12B (illustrated in FIG. 23) in the conveyance direction 10.

$$\Delta t = L/V \qquad \text{Formula 1}$$

The relative distance L (mm) in Formula 1 is obtained preliminarily. When the time difference Δt is determined, the calculator 53F obtains the moving speed V according to Formula 1. Thus, based on the speckle pattern, the image obtaining unit 52A can obtain the position of the web 120 in the conveyance direction 10, the amount of movement, the moving speed, or the combination thereof. The image obtaining unit 52A may output a combination of two or more of the position of the web 120 in the conveyance direction 10, the amount of movement, and the moving speed.

As illustrated in FIG. 6, the imaging unit 16A and the imaging unit 16B is spaced apart in the conveyance direction 10. Via the imaging unit 16A and the imaging unit 16B, images of the web 120 are taken at the respective positions. Then, based on the speckle pattern, the calculator 53F can generate a calculation result indicating the position of the web 120 in the conveyance direction 10 or the orthogonal direction 20, with a high accuracy.

The image obtaining unit 52A may generate a detection result indicating relative positions, for example, representing the difference between a position detected by one sensor unit SEN (i.e., the imaging unit 16A) and a position detected by another sensor unit SEN (i.e., the imaging unit 16B). Alternatively, one of the sensors may take a plurality of images, and the relative positions represent a difference between the position on one image and the position on another image taken by the same sensor unit SEN. That is, the relative positions can be, for example, the difference between the position detected in a previous frame and the position detected in a subsequent frame. Thus, the relative positions indicate a displacement amount from a position detected in the previous frame or a position detected by another sensor unit SEN.

Alternatively, the sensor unit SEN may detect a position in the conveyance direction 10. The sensor unit SEN may be shared for detecting a position in the conveyance direction 10 and detecting a position in the orthogonal direction 20, which reduces the cost of detecting positions in both directions. Additionally, the space for the detection can be small since the number of sensors is reduced.

Further, the calculator 53F performs cross-correlation operation of first image data D1($n$) generated by the imaging unit 16A and second image data D2($n$) generated by the imaging unit 16B. Hereinafter an image generated by the cross-correlation operation is referred to as "correlated image". For example, based on the correlated image, the calculator 53F calculates the displacement amount ΔD(n), which is the amount of displacement from the position detected with the previous frame or by another sensor.

For example, the cross-correlation operation is expressed by Formula 2 below.

$$D1*D2* = -1[F[D1] \cdot F[D2]*] \qquad \text{Formula 2}$$

where D1 represents the first image data being the image taken by the position A, and D2 represents the second image data being the image taken by the position B. In Formula 2, "F[ ]" represents Fourier transform, "F−1[ ]" represents inverse Fourier transform, "*" represents complex conjugate, and "*" represents cross-correlation operation.

As represented in Formula 2, image data representing the correlation image is obtained through cross-correlation operation "D1*D2*" performed on the first image data D1 and the second image data D2. Note that, when the first image data D1 and the second image data D2 are two-dimensional image data, the image data representing the correlation image is two-dimensional image data. When the first image data. D1 and the second image data D2 are one-dimensional image data, the image data representing the correlation image is one-dimensional image data.

Regarding the correlation image, when a broad luminance distribution causes an inconvenience, phase only correlation can be used. For example, phase only correlation is expressed by Formula 3 below.

$$D1*D2* = F-1[P[F[D1]] \cdot P[F[D2]*]] \qquad \text{Formula 3}$$

In Formula 3, "P[ ]" represent taking only phase out of complex amplitude. Note that the amplitude is considered to be "1".

Thus, the calculator 53F can obtain the displacement amount ΔD(n) based on the correlation image even when the luminance distribution is relatively broad.

The correlation image represents the correlation between the first image data D1 and the second image data D2. Specifically, as the match rate between the first image data D1 and the second image data D2 increases, a luminance causing a sharp peak (so-called correlation peak) is output at a position close to a center of the correlation image. When the first image data D1 matches the second image data D2, the center of the correlation image and the peak position overlap.

Based on the displacement in the orthogonal direction 20 (width direction) and the like thus calculated, the head controller 54F controls the actuator to move the liquid discharge head unit 210C in the width direction and discharge liquid. Additionally, based on the displacement in the conveyance direction 10, the liquid discharge head unit 210C discharges the liquid. Note that the timing of ink discharge is controlled with a second signal SIG2 for the liquid discharge head unit 210C (a first signal SIG1 is for the liquid discharge head unit 210K). As illustrated, based on the calculation by the calculator 53F, the head controller 54F outputs the signal to control the position of the liquid discharge head unit 210 in the width position and the timings of the liquid discharge head unit 210. The head controller 54F is implemented by, for example, the controller 520.

The calculator 53F outputs the moving speed V calculated based on the detection result, to a setting unit 55F. The setting unit 55F calculates the aperture, the exposure time, or both, based on the moving speed V transmitted from the calculator 53F. To the setting unit 55F, the moving speed V may be input, according to an operation setting (or operating mode) such as resolution of images output from the image forming apparatus 110. The setting unit 55F can be implemented by a micro computer or the like.

The setting unit 55F may perform setting according to the moving speed V Specifically, when the moving speed V is relatively high, the setting unit 55F sets the exposure time and the aperture to reduced values. By contrast, when the moving speed V is relatively low, the setting unit 55F sets the exposure time and the aperture to increased values. Thus, the aperture may be set according to the moving speed V.

Then, a diaphragm controller implemented by the imaging controller 14 (illustrated in FIG. 4), an actuator, and the like, adjusts the diaphragm to attain the aperture set by the setting unit 55F.

Similarly, the shutter controllers 141A and 141B may control the shutter speed to attain the exposure time set by the setting unit 55F.

Thus, the imaging units 16A and 16B can perform imaging based on the exposure time and the aperture associated with the moving speed V. Alternatively, the controller 520 may perform the calculation and the setting.

Specifically, the aperture is calculated to achieve a received light amount inversely proportional to the exposure time determined by the moving speed V. For example, the aperture is calculated according to Formula 4 below.

$$I = Io \times (NA \times Mo)^2$$

$$DF = \pm k \times WL / \{2 \times (NA)^2\} \quad \text{Formula 4}$$

where "I" represents the brightness of an image, "Io" represents the brightness of the surface of a sample. Further, in Formula 4, "NA" represents the number of apertures (openings), "Mo" represents the magnification of an objective, "DF" represents depth of focus, and "WL" represents wavelength. That is, the number of apertures is set at the diaphragm. In the case of Formula 4, the received light amount is proportional to the square of the number of apertures. Accordingly, when the exposure time is set to "half", the number of apertures is "√2".

The empirically obtained exposure time and the aperture associated with the moving speed V can be stored, in a data form such as a lookup table, in the image memory 15. The setting unit 55F retrieves an exposure time value and an aperture value associated with the moving speed V from the lookup table or the like and sets the exposure time and the aperture to the retrieved values.

Referring back to FIG. 2, in the description below, the sensor units SENK, SENC, SENM, and SENY respectively provided for the liquid discharge head units 210K, 210C, 210M, and 210Y may be collectively referred to as "sensor units SEN".

Further, the term "location of the sensor unit SEN" means the position where the detection is performed. Accordingly, it is not necessary that all components relating to the detection are disposed at the "location of the sensor unit SEN". Some of the components may be connected to the sensor unit SEN via a cable and disposed away therefrom. In FIG. 2, references "SENK, SENC, SENM, and SENY" represent respective example locations of the liquid discharge head units 210K, 210C, 210M, and 210Y".

Preferably, the location of the sensor unit SEN is close to the ink discharge position. That is, the distance between the ink discharge position and the sensor unit SEN is preferably short. When the distance between the ink discharge position and the sensor unit SEN is short, detection error can be suppressed. Accordingly, in the image forming apparatus 110, the sensor unit SEN can detect the position of the recording medium in the conveyance direction 10 or the orthogonal direction 20, with a high accuracy.

Specifically, the sensor unit SEN is disposed between the first roller CR1 and the second roller CR2. In the illustrative embodiment, the sensor unit SENK for black is preferably disposed in an inter-roller range INTK1 between the first and second rollers CR1K and CR2K. Similarly, the sensor unit SENC for cyan is preferably disposed in an inter-roller range INTC1 between the first and second rollers CR1C and CR2C. The sensor unit SENM for magenta is preferably disposed in an inter-roller range 1NTM1 between the first and second rollers CR1M and CR2M. The sensor unit SENY for yellow is preferably disposed in an inter-roller range INTY1 between the first and second rollers CR1Y and CR2Y. The inter-roller ranges INTY1, INTC1, INTM1, and INTY1 are collectively referred to as "inter-roller ranges INT1". The sensor unit SEN disposed between the first and second rollers CR1 and CR2 can detect the recording medium at a position close to the ink discharge position. Further, since the moving speed V is relatively stable in a portion between the rollers, the image forming apparatus 110 can detect the position of the recording medium in the conveyance direction 10 or the orthogonal direction 20, with a high accuracy.

More preferably, in each inter-roller ranges INT1, the sensor unit SEN is disposed between the ink discharge position and the first roller CR1 (closer to the first roller CR1 than the ink discharge position). In other words, the sensor unit SEN is preferably disposed upstream from each ink discharge position in the conveyance direction 10.

Specifically, the sensor unit SENK for black is, more preferably, disposed in a range extending from the black ink discharge position PK upstream to the first roller CR1K for black in the conveyance direction 10 (hereinafter "upstream range INTK2"). Similarly, the sensor unit SENC for cyan is, more preferably, disposed in a range extending from the cyan ink discharge position PC upstream to the first roller CR1C for cyan (hereinafter "upstream range INTC2"). The sensor unit SENM for magenta is, more preferably, disposed in a range extending from the magenta ink discharge position PM upstream to the first roller CR1M for magenta (hereinafter "upstream range INTM2"). The sensor unit SENY for yellow is, more preferably, disposed in a range extending from the yellow ink discharge position PY upstream to the first roller CR1Y for yellow (hereinafter "upstream range INTY2").

When the sensor units SEN are respectively disposed in the upstream ranges INTK2, INTC2, INTM2, and INTY2, the image forming apparatus 110 can detect the recording medium (conveyed object) with a high accuracy. The sensor unit SEN thus disposed is upstream from the position at which ink droplets strike the recording medium (also "droplet strike position") in the conveyance direction 10. Therefore, in the image forming apparatus 110, the sensor unit SEN can accurately detect the position of the recording medium in the conveyance direction 10, the orthogonal direction 20, or both, at a position upstream from the droplet strike position. Accordingly, the controller 520 (or the calculator 53F) can calculate respective ink discharge timings (i.e., operation timing) of the liquid discharge head units 210, the amount by which the head unit is to move (i.e., head moving amount), or both. In other words, in a period from when the position of a given portion of the web 120 is detected on the upstream side of the droplet strike position to when the detected portion of the web 120 reaches the droplet strike position, the operation timing is calculated or the head unit is moved. Therefore, the image forming apparatus 110 can change the droplet strike position with high accuracy.

Note that, assuming that the sensor unit SEN is disposed directly below the liquid discharge head unit 210, in some cases, a delay of control action renders an image out of color registration. Accordingly, disposing the sensor unit SEN upstream from the droplet strike position can suppress misalignment in color superimposition and improve image quality. There are cases where layout constraints hinder disposing the sensor unit SEN adjacent to the droplet strike position. Accordingly, the sensor unit SEN is preferably disposed closer to the first roller CR1 than the ink discharge position.

As in the example described below, the sensor unit SEN can be disposed directly below each liquid discharge head unit 210. The sensor unit SEN disposed directly below the head unit can accurately detect the amount of movement of the recording medium directly below the head unit. Therefore, in a configuration in which the speed of control action is relatively fast, the sensor unit SEN is preferably disposed closer to the position directly below each liquid discharge head unit 210. However, the position of the sensor unit SEN is not limited to a position directly below the liquid discharge head unit 210, and similar calculation is feasible when the sensor unit SEN is disposed otherwise.

Alternatively, in a configuration where error is tolerable, the sensor unit SEN can be disposed directly below the liquid discharge head unit 210, or downstream from the position directly below the liquid discharge head unit 210 in the inter-roller range INT1.

The image forming apparatus 110 may further includes a measuring instrument such as an encoder, as described bellow. For example, the encoder is attached to a rotation shaft of the roller 230 (i.e., the driving roller). Then, the encoder can measure the amount of movement of the web 120 in the conveyance direction 10, based on the amount of rotation of the roller 230. When the measurement results are used in combination with the detection results generated by the sensor unit SEN, the liquid discharge head unit 210 can discharge ink to the web 120 accurately.

Figure 7A:
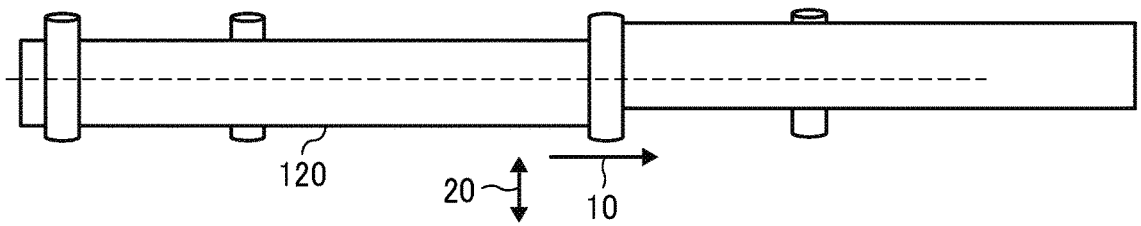
FIGS. 7A and 7B are plan views of a meandering recording medium (a continuous sheet.
Figure 7B:
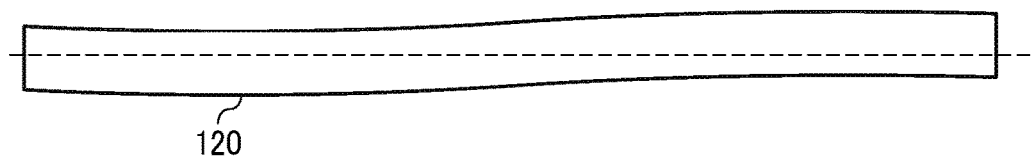

Descriptions are given below of fluctuations of the recording medium in the orthogonal direction 20, with reference to FIGS. 7A and 7B. FIGS. 7A and 7B are plan view of the web 120 being conveyed. In FIG. 7A, while the web 120 is conveyed in the conveyance direction 10 by the rollers (such as the rollers 230, CR1, and CR2 in FIG. 2), the position of the web 120 may fluctuate in the orthogonal direction 20 as illustrated in FIG. 7B. That is, the web 120 may meander as illustrated in FIG. 7B.

The fluctuation of the position of the web 120 in the orthogonal direction 20 (hereinafter "orthogonal position of the web 120"), that is, the meandering of the web 120, is caused by eccentricity of a conveyance roller (the driving roller in particular), misalignment, or tearing of the web 120 by a blade. When the web 120 is relatively narrow in the orthogonal direction 20, for example, thermal expansion of the roller affect fluctuation of the web 120 in the orthogonal position.

Descriptions are given below of a cause to render images out of color registration, with reference to FIG. 8. Due to fluctuations (meandering illustrated in FIG. 7B) of the web 120 in the orthogonal position, images become out of color registration as illustrated in FIG. 8.

Specifically, to form a multicolor image on a recording medium using a plurality of colors, the image forming apparatus 110 superimposes a plurality of different color inks discharged from the liquid discharge head units 210, through so-called color plane, on the web 120.

Figure 8:
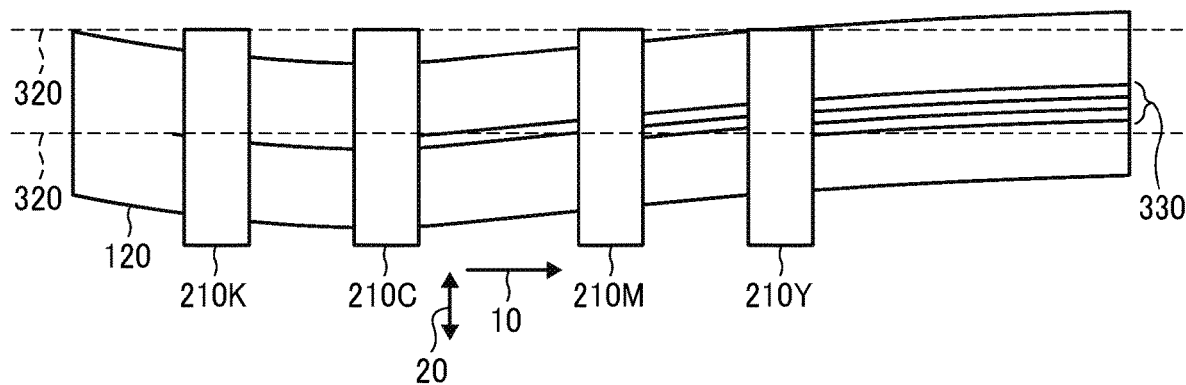
FIG. 8 is a plan view of an image out of color registration on the meandering recording medium.

As illustrated in FIG. 7B, the web 120 can fluctuate in position and, for example, meanders with reference to lines 320 illustrated in FIG. 8. Assuming that the liquid discharge head units 210 discharge respective inks to an identical portion (i.e., an intended droplet strike position) on the web 120 in this state, a portion 330 out of color registration is created since the intended droplet strike position fluctuate in the orthogonal direction 20 while the web 120 meanders between the liquid discharge head units 210. The portion 330 out of color registration is creased as the position of a line or the like, drawn by the respective inks discharged from the liquid discharge head units 210, shakes in the orthogonal direction 20. The portion 330 out of color registration degrades the quality of the image on the web 120.

Figure 9:
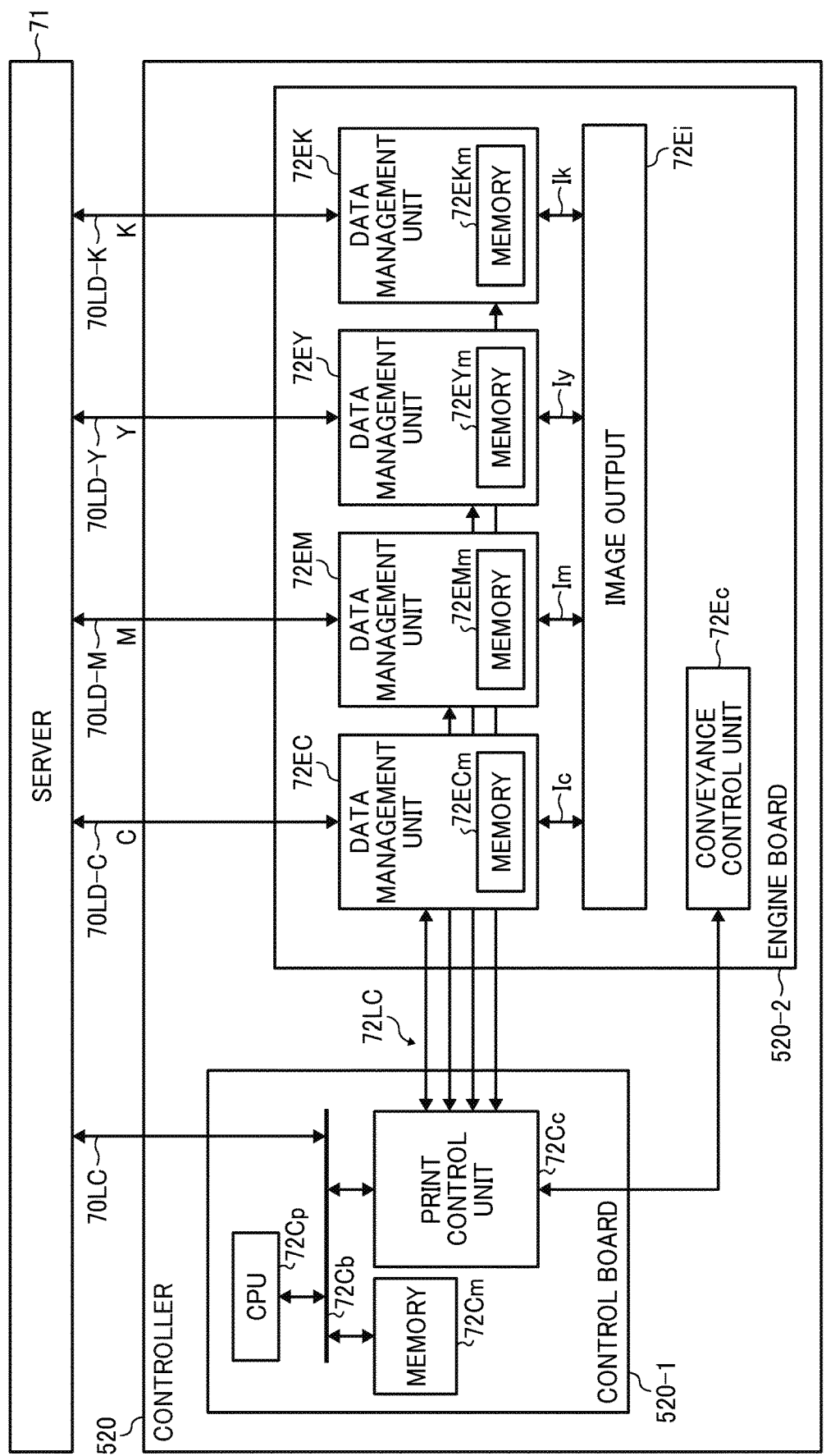
FIG. 9 is a schematic block diagram of a configuration of a controller of the image forming apparatus illustrated in FIG. 2.

FIG. 9 is a schematic block diagram of an image forming system including a server 71 serving as a higher-order device (e.g., an information processing apparatus), and the image forming apparatus 110. In the illustrated example, the controller 520 includes a control board 520-1 and an engine board 520-2. The control board 520-1 instructs the engine board 520-2 on image formation according to image data and control data input from the server 71.

The higher-order device is not limited to the server 71 but can be a client computer (personal computer or PC) or a host device. Although the controller 520 includes the control board 520-1 and the engine board 520-2 in FIG. 9, the number of boards is not limited thereto.

The control board 520-1 governs operation of the engine board 520-2. The control board 520-1 transmits and receives the control data to and from the server 71 via a control line 70LC. The control board 520-1 further transmits and receives the control data to and from the engine board 520-2 via a control line 72LC. Through such data transmission and reception, the control data indicating printing conditions and the like are input to the control board 520-1. The control board 520-1 stores the printing conditions, for example, in a resistor. The control board 520-1 then controls the engine board 520-2 according to the control data to form an image based on print job data, that is, the control data.

The control board 520-1 includes a CPU 72Cp, a print control unit 72Cc, and a memory 72Cm. The CPU 72Cp and the print control unit 72Cc (e.g., an electronic circuit) are connected to each other via a bus 72Cb to communicate with each other. The bus 72Cb is connected to the control line 70LC via a communication interface or the like.

The CPU 72Cp controls the entire image forming apparatus 110 based on a control program and the like. That is, the CPU 72Cp is a processor as well as a controller.

The print control unit 72Cc transmits and receives data indicating a command or status to and from the engine board 520-2, based on the control date transmitted from the server 71. Thus, the print control unit 72Cc controls the engine board 520-2.

To the engine board 520-2, a plurality of data lines, namely, data lines 70LD-C, 70LDM, 70LD-Y, and 70LD-K are connected. The engine board 520-2 receives the image data from the server 71 via the plurality of data lines. Then, the engine board 520-2 governs image formation of respective colors, controlled by the control board 520-1.

The engine board 520-2 includes a plurality of data management units 72EC, 72EM, 72EY, and 72EK (also collectively "data management units 72E"), an image output 72Ei, and a conveyance control unit 72Ec, each of which can be implemented by an electronic circuit.

Figure 10:
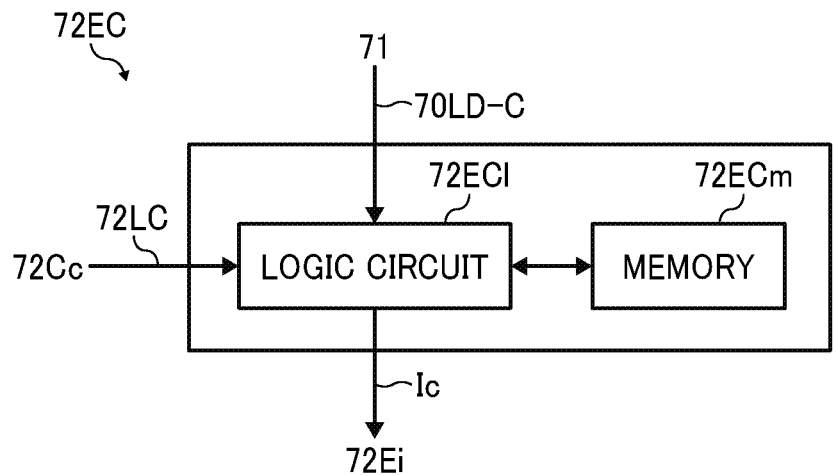
FIG. 10 is a block diagram of a configuration of a data management unit of the controller illustrated in FIG. 9.

FIG. 10 is a block diagram of a configuration of the data management unit 72E. The plurality of data management units 72E can have an identical configuration. The data management unit 72EC is described below as a representative. Redundant descriptions are omitted.

The data management unit 72EC includes a logic circuit 72ECl and a memory 72ECm. As illustrated in FIG. 10, the logic circuit 72ECl is connected via a data line 70LD-C to the server 71. The logic circuit 72ECl is connected via the control line 72LC to the print control unit 72Cc. That the logic circuit 72ECl is implemented by, for example, an application specific integrated circuit (ASIC) or a programmable logic device (PLD).

According to a control signal input from the control board 520-1 (illustrated in FIG. 9), the logic circuit 72ECl stores, in the memory 72ECm, the image data input from the server 71.

According to a control signal input from the control board 520-1, the logic circuit 72ECl retrieves, from the memory 72ECm, cyan image data Ic. The logic circuit 72ECl then transmits the cyan image data Ic to the image output 72Ei.

The memory 72ECm preferably has a capacity for storing image data extending about three pages. With the capacity for storing image data extending about three pages, the memory 72ECm can store the image data input from the server 71, data image being used current image formation, and image data for subsequent image formation.

Figure 11:
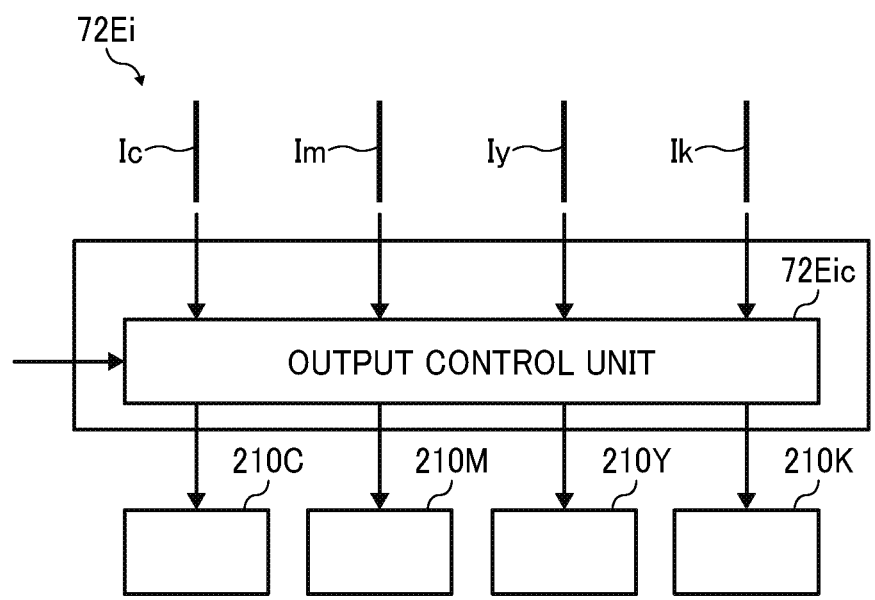
FIG. 11 is a block diagram of a configuration of an image output of the controller illustrated in FIG. 9.

FIG. 11 is a block diagram of a configuration of the image output 72Ei. As illustrated in FIG. 11, the image output 72Ei includes an output control unit 72Eic to output respective color image data to the liquid discharge head units 210K, 210C, 210M, and 210Y That is, the output control unit 72Eic controls the liquid discharge head units 210 based on the image data input thereto.

The output control unit 72Eic controls the plurality of liquid discharge head units 210 either simultaneously or individually. That is, the output control unit 72Eic receives timing commands and changes the timings at which the liquid discharge head units 210 discharge respective color inks. The output control unit 72Eic may control one or more of the liquid discharge head units 210 based on the control signal input from the control board 520-1 (illustrated in FIG. 9). Alternatively, the output control unit 72Eic may control one or more of the liquid discharge head units 210 based on user instructions.

In the example illustrated in FIG. 9, the image forming apparatus 110 has different routes for inputting the image data from the server 71 and for transmission and reception of control data, with the server 71 and the image forming apparatus 110.

The image forming apparatus 110 may form single-color images using, for example, black ink. In the case of single-color image formation using black ink, to accelerate image formation speed, the image forming apparatus 110 can include one data management unit 72E and four black liquid discharge head units 210. In such as configuration, the plurality of black liquid discharge head units 210 discharge black ink. Accordingly, the image formation speed is faster than that in the configuration using one black liquid discharge head unit 210.

The conveyance control unit 72Ec (in FIG. 9) controls a conveyance device 200 (illustrated in FIG. 2) to convey the web 120. The conveyance device 200 includes a motor coupled to the rollers (e.g., the roller 230 and the first and second nip roller pairs NR1 and NR2) to convey the web 120, a mechanism therefor, and a driver for conveying the web 120.

Figure 12:
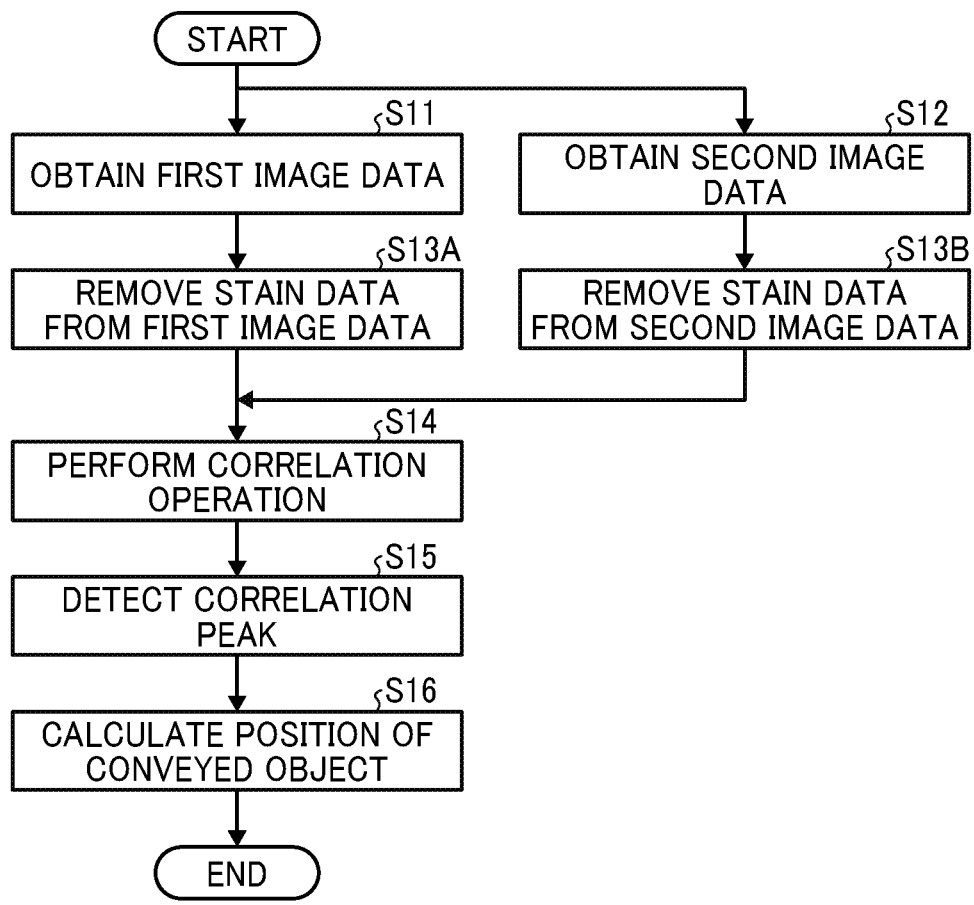
FIG. 12 is a flowchart of processing performed by the conveyed object detector illustrated in FIG. 6.

FIG. 12 is a flowchart of an example of operation performed by the conveyed object detector 500. The conveyed object detector 500 performs the processing illustrated in FIG. 12 for each predetermined period. The processing described below is performed either during image formation or during an interval between image formation.

In the illustrated example, steps S11 and S13A are performed in parallel to steps S12 and S13B. However, the order of steps is not limited thereto. Alternatively, steps S11 and S13A may be performed after or before steps S12 and S13B one after another.

At S11, the image obtaining unit 52A obtains the first image data D1, which is data of the imaging at the position A illustrated in FIG. 6. The first image data D1 is stored in the image memory 15A.

At S12, the image obtaining unit 52B obtains the second image data D2, which is data of the imaging at the position B illustrated in FIG. 6. The second image data D1 is stored in the image memory 15B.

Description are given below of recognition of an object (stains or dust, hereinafter referred to as "adhering object BD") adhering to the sensor unit SEN, performed before image formation, or interval time (corresponding to non-image area on the web 120) during image formation. In one embodiment, the recognition is performed for each of the plurality of image obtaining units 52. Alternatively, the recognition is performed in the two image obtaining units 52 used to obtain the first and second image data D1 and D2. For example, the adhering object BD is recognized as illustrated in FIGS. 13A through 13C, and stain data is preliminarily stored in a stain data memory 58F.

Figure 13A:
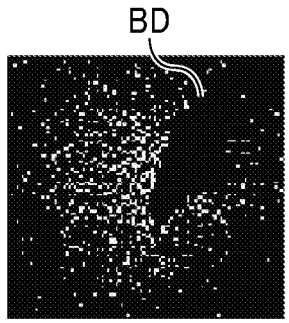
FIGS. 13A, 13B, and 13C are views of examples of perception of an adhering object according to an embodiment.
Figure 13B:
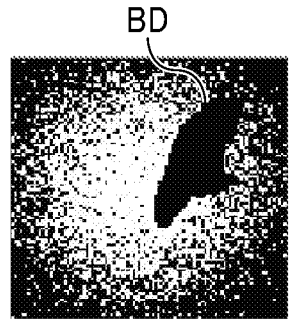
Figure 13C:
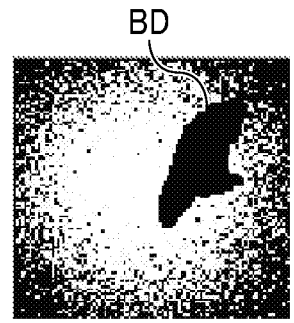

FIGS. 13A, 13B, and 13C are illustrations of examples of recognition of an adhering object BD. In FIGS. 13A to 13C, the adhering object is a stain such as ink. FIGS. 13B to 13C are generated by superimposing image data of a plurality of images. Specifically, FIG. 13A is an example in which the number (N) of image is one (N=1). FIG. 13B is an example in which 10 images are superimposed (N=10). FIG. 13C is an example in which 20 images are superimposed (N=20).

As illustrated in FIGS. 13A to 13C, the area of the image representing the adhering object BD does not change (i.e., a changeless area) even when the subject of imaging is changed. Accordingly, as the number of superimposed images increases, the adhering object BD becomes clearer, as illustrated in FIG. 13C. Thus, the recognition unit 56F recognizes the adhering object BD based on a plurality of image data. That is, the recognition unit 56F recognizes the changeless area on the image generated by superimposing a plurality of images. The image forming apparatus 110 stores the data of adhering object BD (i.e., stain data) in the stain data memory 58F.

The number of superimposed images for recognizing the adhering object BD is determined by the processing time or the like.

For example, recognizing that the changeless area occupies a predetermined area or greater of the image, the recognition unit 56F determined that the changeless area represents the adhering object BD.

To alleviate the degradation of detection accuracy caused by noise, for example, the image forming apparatus 110 may compare a previous image of the adhering object BD with a current image of the adhering object BD. When the difference as a result of the comparison changes in a short period, by an amount greater or smaller than a predetermined value, the recognition unit 56F again performs recognizing processing. Thus, degradation of detection accuracy caused by noise can be suppressed.

Further, when the recognition unit 56F recognizes that the amount or degree of stain is equal to or greater than a threshold, an alert may be issued or a message may be displayed. When the range of the image considered to represent the adhering object DB exceeds a predetermined size, the controller 520 determines that cleaning is necessary and outputs an alert or message. When the adhering object BD is recognized in the entire image or the entire image is considered to be filled with the adhering object BD, the controller 520 may detect malfunction of the conveyed object detector 500 or malfunction of a component (e.g., a harness) relating to the conveyed object detector 500.

At S13A, a removal unit 57F (illustrated in FIG. 6) removes, from the first image data D1 stored as described above, the stain data (i.e., first stain data) representing the adhering object BD adhering to the image obtaining unit 52A or the optical system thereof.

In the first image data D1, the removal unit 57F rewrites the data of the range representing the adhering object BD to "0", based on the first image data D1 stored in the image memory 15A. To rewrite the data to "0", the removal unit 57F may perform, for example, multiplication. Thus, the removal unit 57F removes the first stain data from the first image data D1 to generate first corrected image data.

At S13B, the removal unit 57F removes, from the second image data D2, the stain data (second stain data) representing an adhering object BD adhering to the second image obtaining unit 52B. In a manner similar to that performed at S13A, the removal unit 57F can rewrite the data representing the adhering object BD to "0" to remove the second stain data from the second image data D2 to generate second corrected image data.

Note that, differently from the processing illustrated in FIG. 12, in another embodiment, the removal unit 57F removes both of the first stain data and the second stain data from each of the first image data D1 and the second image data D2. In this case, although the number of effective pixel decreases, the noise can be suppressed better, improving the signal-to-noise ratio.

At S14, the calculator 53F performs a correlation operation, specifically, a correlation operation on the first corrected image data processed at S13A and the second corrected image data processed at S13B. For example, the correlation operation is expressed by Formula 2 described above. The parameters of Formula 2 are described above.

$$D1*D2*=F-1[F[D1]·F[D2]*]$$  Formula 2

When the correlation operation is performed according to Formula 2, image data representing the correlation image is obtained. As described above, when the first image data D1 and the second image data D2 are two-dimensional image data, the result of operation image is two-dimensional image data. When the first image data D1 and the second image data D2 are one-dimensional image data, the result of operation is one-dimensional image data. From the result of operation, the displacement between the first image data D1 and the second image data. D2 and the like can be calculated.

Figure 14:
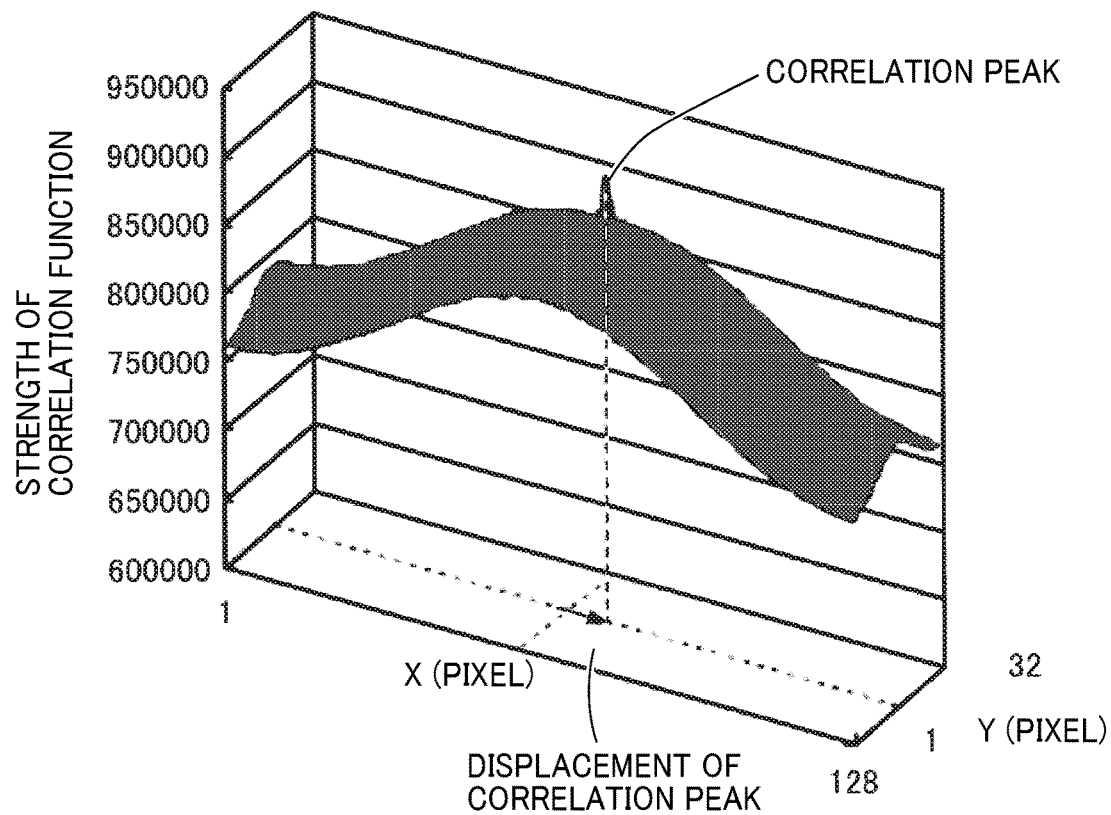
FIG. 14 is a diagram of example results of correlation operation according to an embodiment.

FIG. 14 is a diagram of example results of correlation operation performed by the calculator 53F, according to Formula 2. FIG. 14 illustrates a profile of strength of correlation function. In FIG. 14, X axis and Y axis represent serial number of pixel. In the illustrated operation results, on the background noise depending on ink mist and lighting amount profile, a peak corresponding to the amount of travel of the web 120 between the frames. Depending on the shape of profile of the background noise, there may be an error in the peak position detected. By contrast, when the adhering object BD is removed as in steps S13A and S13B in FIG. 12, the calculator 53F can reduce the noise caused by ink mist and background noise from the result of operation. That is, the calculator 53F can improve signal-to-noise ratio (SNR). As such noise is reduced, effects of uneven lighting by the light source are suppressed.

Although the description above concerns a case where fluctuations are present in Y direction, the correlation peak occurs at a position displaced in the X direction when there are fluctuations in the X direction.

With the above-described correlation operation, the calculator 53F can calculate the displacement and the like even during image formation.

At S15 (illustrated in FIG. 12), the calculator 53F detects the correlation peak in the result of operation illustrated in FIG. 14. When the noise of ink mist and background noise are reduced in the result of operation, the calculator 53F can accurately detect the displacement of the correlation peak from the center.

At S16 in FIG. 12, the calculator 53F performs position calculation, specifically, calculates the amount of movement of the web 120 (conveyed object) in the orthogonal direction, based on the correlation peak detected at S15, as illustrated in FIG. 14. That is, the calculator 53F can calculate so-called meandering amount of the web 120 from the position of the correlation peak.

Figure 15:
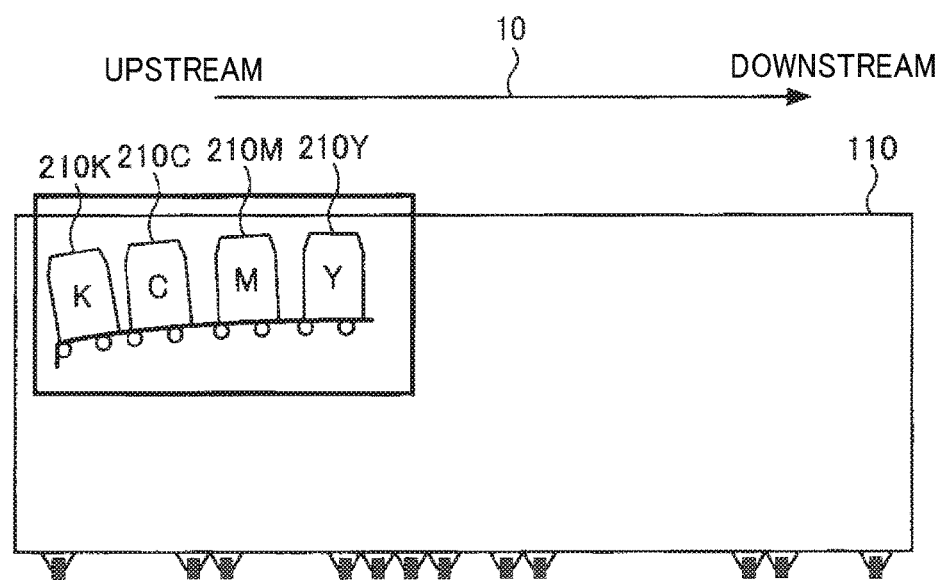
FIG. 15 is a side view of the image forming apparatus illustrated in FIG. 1.
Figure 16A:
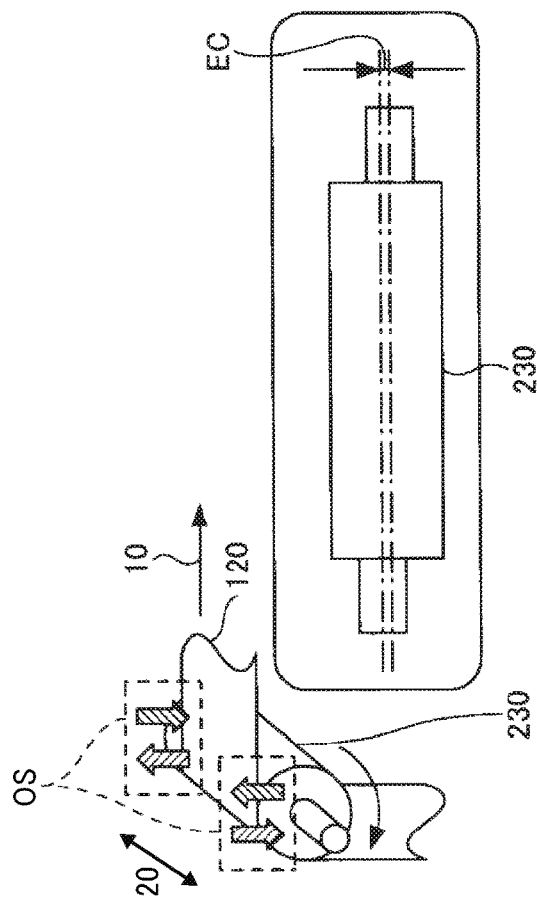
FIGS. 16A and 16B are schematic diagrams illustrating operation of the image forming apparatus illustrated in FIG. 15.
Figure 16B:
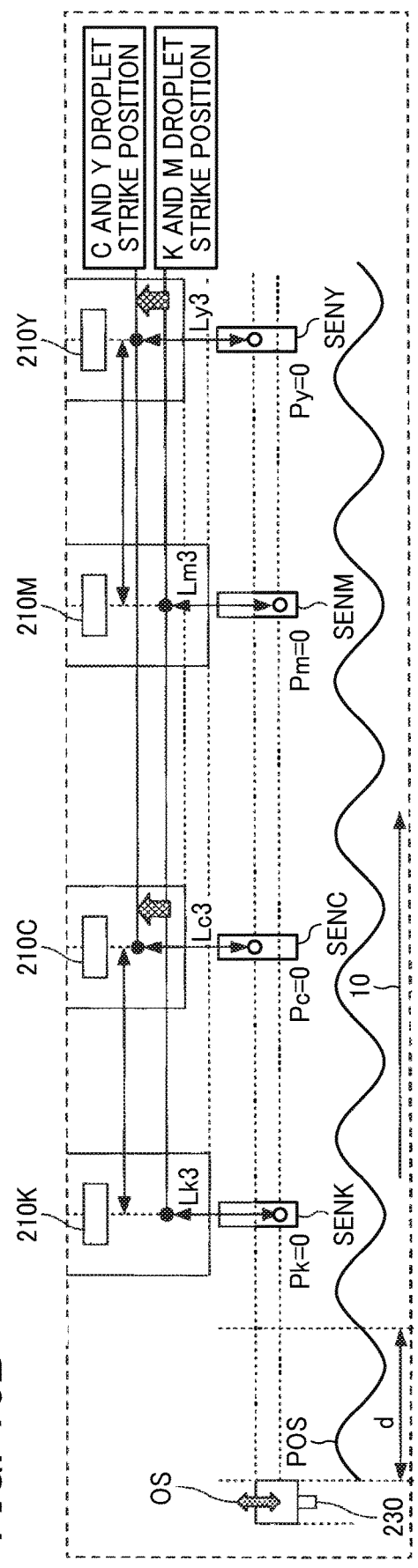

With reference to FIGS. 15, 16A and 16B, descriptions are given below of processing performed by the liquid discharge apparatus according to one embodiment. In FIGS. 15, 16A, and 16B, the sensor units SEN are disposed directly below the respective liquid discharge head units 210. However, the locations of the sensor units SEN are not limited thereto as long as close to the respective ink discharge positions. That is, the sensor units SEN are disposed to accurately detect the position of the web 120 at the respective ink discharge positions. For example, each sensor unit SEN is disposed between the first roller CR1 and the second roller CR2.

In the example illustrated in FIG. 15, inks are discharged in the order of black, cyan, magenta, and yellow. FIG. 16B is a plan view of the image forming apparatus 110 illustrated in FIG. 15. Descriptions are given below of a case where the roller 230 (i.e., the driving roller) has eccentricity, for example eccentricity EC illustrated in FIG. 16A. The eccentricity EC of the roller 230, which is the driving roller, causes oscillation OS or sway of the roller 230 as the web 120 is conveyed. With the oscillation OS, a position POS of the web 120 in the orthogonal direction 20 fluctuates. That is, the oscillation OS causes "meandering". In the illustrated example, the position POS is at the end of the web 120 for ease of understanding. Note that, in the liquid discharge apparatus, the sensor unit SEN may be disposed below the web 120 (on the back side (opposite side) of the web 120 when the image formation face serving as a front side), and the position POS may be detected with reference to the end of the web 120.

To suppress misalignment in color superimposition of other color inks on the black ink, the calculator 53F substrates, from the current orthogonal position of the web 120 detected by the sensor unit SEN, the orthogonal position of the web 120 in the immediately previous detection period, thereby calculating the displacement of the web 120. Specifically, the calculator 53F calculates a difference Pk between the orthogonal position of the web 120 detected by the sensor unit SENK and the orthogonal position of the web 120 below the liquid discharge head unit 210K. Similarly, the calculator 53F calculates a difference Pc between the orthogonal position of the web 120 detected by the sensor unit SENC and the orthogonal position of the web 120 below the liquid discharge head unit 210C. Similarly, the calculator 53F calculates a difference Pm between the orthogonal position of the web 120 detected by the sensor unit SENM and the orthogonal position of the web 120 below the liquid discharge head unit 210M. Similarly, the calculator 53F calculates a difference Py between the orthogonal position of the web 120 detected by the sensor unit SENY and the orthogonal position of the web 120 below the liquid discharge head unit 210Y.

The differences between the droplet strike positions, at which the ink droplets discharged from the liquid discharge head units 210 strike the web 120, and the end of the web 120 are referred to as differences Lk3, Lc3, Lm3, and Ly3. Since the sensor units SEN detect the orthogonal position of the web 120, each of the differences Pk, Pc, Pm, and Py is 0. Such relations are expressed by the following formulas.

$$Lc3=Lk3-Pc=Lk3$$

$$Lm3=Lk3$$

$$Ly3=Lk3-Py=Lk3 \quad \text{Formula 5}$$

According to Formula 5, the relation "Lk3=Lm3=Lc3=Ly3" is obtained. Thus, the controller 520 (the head controller 54F) controls actuator (AC1, AC2, AC3, or AC4 in FIG. 18) to move the liquid discharge head unit 210 in response to the displacement of the web 120, and the image forming apparatus 110 can improve the accuracy of droplet strike position in the orthogonal direction 20. As the accuracy of droplet strike position improves, misalignment in color superimposition is suppressed, thereby improving the image quality.

In other words, when the position of the liquid discharge head unit 210 is adjusted during image formation to enhance the accuracy of droplet strike position, image quality can improve.

The sensor unit SEN is preferably disposed closer to the first roller CR1 than the ink discharge position.

Referring to FIG. 17, descriptions are given below of one example position of the sensor unit SEN, for example, of black. In this example, the sensor unit SENK for black is disposed between the first roller CR1K and the second roller CR2K, more specifically, between the black ink discharge position PK and the first roller CR1K (closer to the first roller CR1K than the black ink discharge position PK) in the conveyance direction 10. The distance of the sensor unit SENK from the black ink discharge position PK toward the first roller CR1K is determined by the time required for control operation. For example, the sensor unit SENK is at 20 mm (upstream by 20 mm in the conveyance direction 10) from the black ink discharge position PK toward the first roller CR1K.

When the location of the sensor unit SEN is close to the ink discharge position, detection error E1 is suppressed, and the accuracy of droplet strike position on the recording medium can improve. As the accuracy of droplet strike position improves, misalignment in color superimposition is suppressed, thereby improving the image quality.

Such a configuration is free of layout constraint of setting the distance between the adjacent two liquid discharge head units 210 to an integral multiple of a length of circumference of the roller 230 (i.e., a circumference distance d illustrated in FIG. 16A). Thus, position of the liquid discharge head unit 210 is determined more flexibly. That is, even when the distance between the adjacent two liquid discharge head units 210 is not an integral multiple of the circumference length d of the roller 230, the accuracy of droplet strike position of each color ink is improved.

FIG. 18 is a plan view of the sensor units SEN according to an embodiment. The sensor units SEN are disposed such that detection ranges thereof overlap with the web 120 in the width direction (the orthogonal direction 20). In FIG. 18, the sensor units SENK, SENC, SENM, and SENY are respectively disposed at positions PS1, PS2, PS3, and PS4, which are within the area of the web 120 in the orthogonal direction 20. The image forming apparatus 110 controls the actuators AC1, AC2, AC3, and AC4 to move the liquid discharge head units 210K, 210C, 210M, and 210Y in the orthogonal direction 20, respectively.

In FIG. 18, the sensor units SEN are disposed facing the liquid discharge head units 210, respectively, via the web 120. Each sensor unit SEN includes a light-emitting element to emit light (e.g., laser light) onto the web 120 and an image sensor to image a range of the web 120 irradiated with the light emitted from the light-emitting element.

As the laser light emitted from the light-emitting element is diffused on the surface of the web 120 and superimposed diffusion waves interfere with each other, a pattern such as a speckle pattern appears. The image sensor of the sensor unit SEN captures and images such a speckle pattern. Based on the change of position of the pattern captured by the image sensor, the controller 520 (or the calculator 53F) can obtain the amount by which the liquid discharge head unit 210 is to be moved.

Additionally, in this structure, the liquid discharge head unit 210 and the sensor unit SEN are preferably disposed such that the operation area (e.g., the image formation area) of the liquid discharge head unit 210 overlaps, at least partly, with the detection range of the sensor unit SEN.

COMPARATIVE EXAMPLE 1

Figure 19:
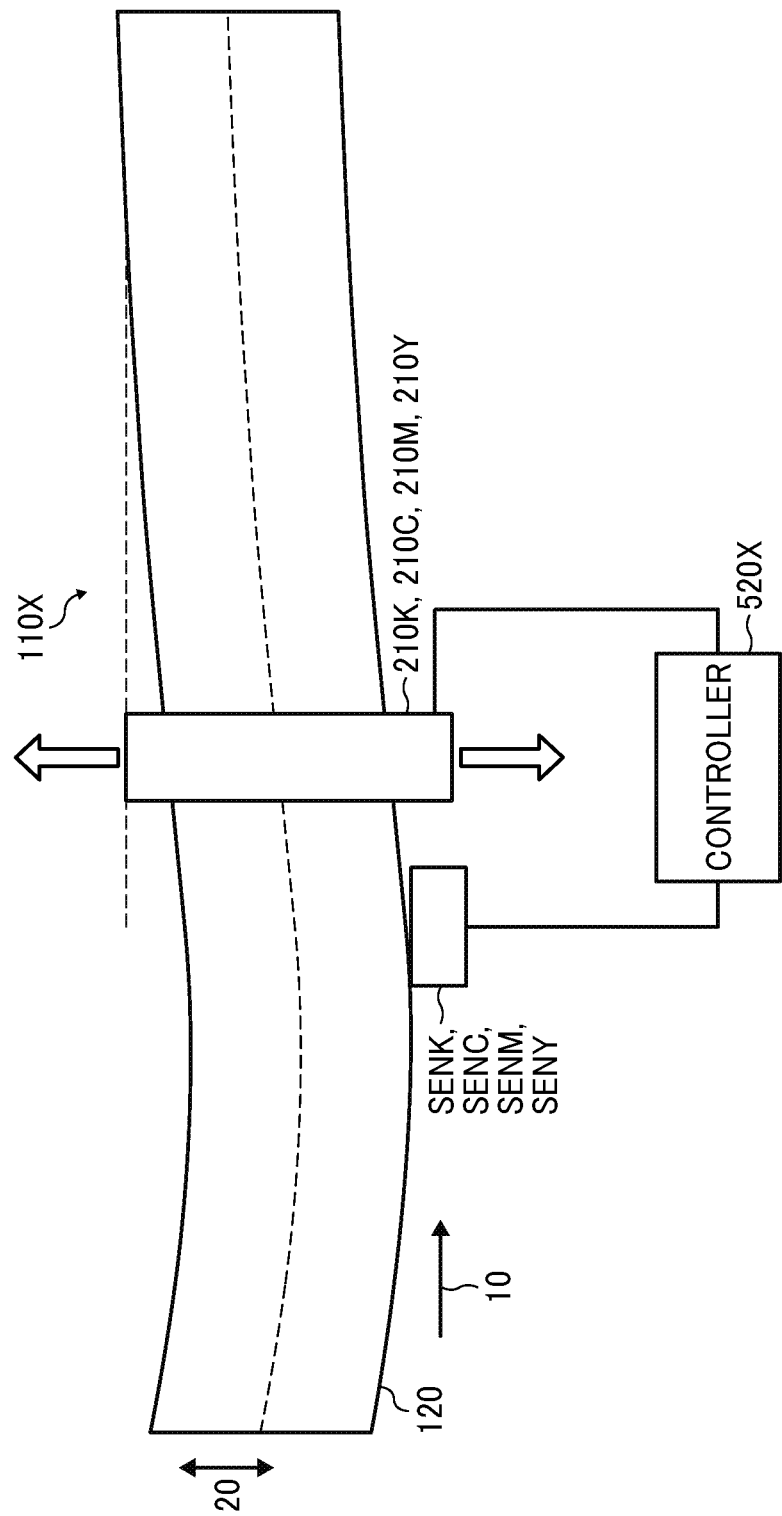
FIG. 19 is a plan view of a web conveyed in an image forming apparatus according to Comparative example 1.

FIG. 19 is a plan view of the web 120 conveyed in a liquid discharge apparatus 110X according to Comparative example 1. In the comparative example illustrated in FIG. 19, the orthogonal position of the web 120 is detected before a given portion of the web 120 reaches the ink discharge position of the liquid discharge head unit 210 (210K, 210C, 210M, or 210Y). In Comparative example 1, each sensor unit SEN (SENK, SENC, SENM, and SENY) is disposed, for example, 200 mm upstream from a position directly below the liquid discharge head unit 210 in the conveyance direction 10. In Comparative example 1, based on detection by the sensor unit SEN, a controller 520X controls the actuator to move the liquid discharge head unit 210 to compensate for displacement (meandering) of the web 120 (e.g., a recording medium) in the ink discharge position.

With reference to FIG. 20, descriptions are given below of processing performed by the liquid discharge apparatus 110X according to Comparative example 1. In Comparative example 1, the distance between the adjacent two liquid discharge head units 210 is an integral multiple of the circumference distanced of the roller 230. In this case, the difference (Pk, Pc, Pm, or Pm) between the orthogonal position of the web 120 detected by the sensor unit SEN and that at the position directly below the liquid discharge head unit 210 is "0". Thus, in Comparative example 1, the distances Lk1, Lc1, Lm1, and Ly1 of the droplet strike positions of black, cyan, magenta, and yellow from the end of the web 120, in the width direction, are in the relation "Lk1=Lc1=Lm1=Ly1".

With reference to FIG. 21, descriptions are given below of processing performed by the liquid discharge apparatus 110X according to Comparative example 2. The hardware configuration of Comparative example 2 is similar to that of Comparative example 1. Comparative example 2 is different from Comparative example 1 in that the distance between the liquid discharge head units 210K and 210C is 1.75 times longer than the circumference distance d of the roller 230 and the distance between the liquid discharge head units 210M and 210Y is 1.75 times longer than the circumference distance d. That is, the distance between the liquid discharge head units 210 and 210 for black and cyan and the distance between the liquid discharge head units 210 and 210 for magenta and yellow is not integral multiple of the circumference length d of the roller 230.

In comparative example 2, the difference (Pk, Pc, Pm, and Py) between the orthogonal position of the web 120 detected by the sensor unit SEN and the orthogonal position of the web 120 below the corresponding liquid discharge head unit 210 for respective colors and the distances Lk1, Lc1, Lm1, and Ly1 of the droplet strike positions of black, cyan, magenta, and yellow from the end of the web 120 in the width direction are expressed by the following formulas.

$$Lc2=Lk2-Pc$$

$$Lm2=Lk2Ly2=Lk2-Py \quad \text{Formula 6}$$

Accordingly, the relation "Lk2=Lm2≠Lc2=Ly2" is obtained. In this comparative example, when the distance between the adjacent two liquid discharge head units 210 is not an integral multiple of the circumference distance d of the roller 230, the orthogonal positions of the web 120 directly below the liquid discharge head unit 210C and the liquid discharge head unit 210M is shifted by the differences Pc and Py, respectively. Accordingly, fluctuations in the orthogonal position of the web 120 are not compensated for in the ink discharge position, allowing misalignment in color superimposition.

FIG. 22 illustrates a location of the sensor unit SEN in the liquid in another comparative example. In the arrangement in which the sensor unit SENK is away from the black ink discharge position PK as in FIG. 22, a detection error E2 is likely to be large.

Figure 23:
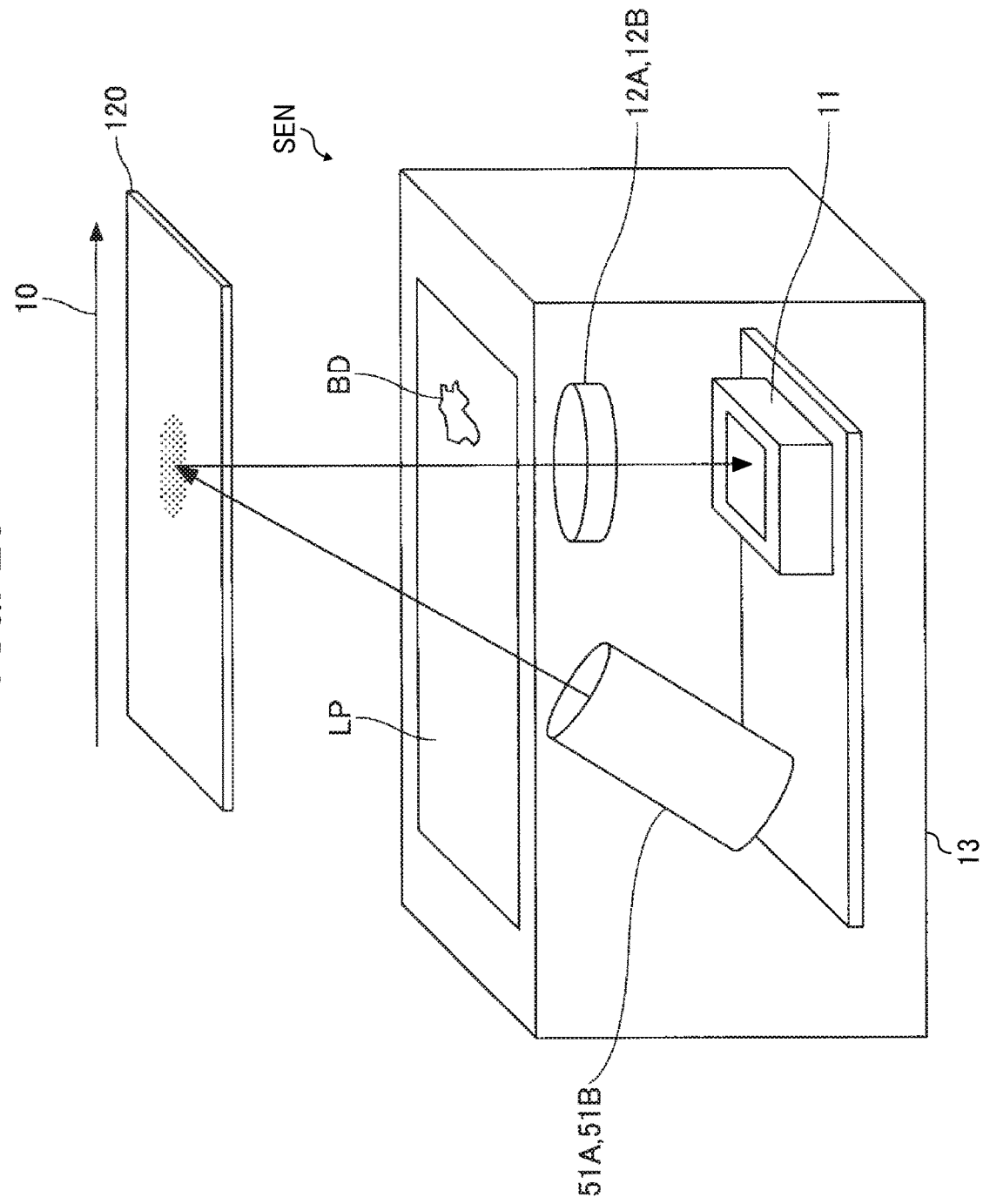
FIG. 23 is a schematic view of a sensor unit according to an embodiment.

FIG. 23 is a schematic view of the conveyed object detector 500 according to the present embodiment, to detect the web 120. As illustrated in FIG. 23, the first light source 51A, the second light source 51B, and an area sensor 11 are often contained in a case 13. The case 13 has an optical window LP made of a material having a high transmittancy so that the optical systems, such as he area sensor 11 and the first imaging lens 12A (or the second imaging lens 12B), contained therein receive light reflected on the web 120. Thus, the case 13 and the optical window LP thereof provide dustproofing for the optical systems of the conveyed object detector 500 to reduce effects of stain (e.g., paper dust).

Although the adhering object BD (e.g., ink or paper dust) may adhere, for example, to the optical window LP, the effect of the adhering dust BD is suppressed through the processing illustrated in FIG. 12.

Functional Configuration

Figure 24:
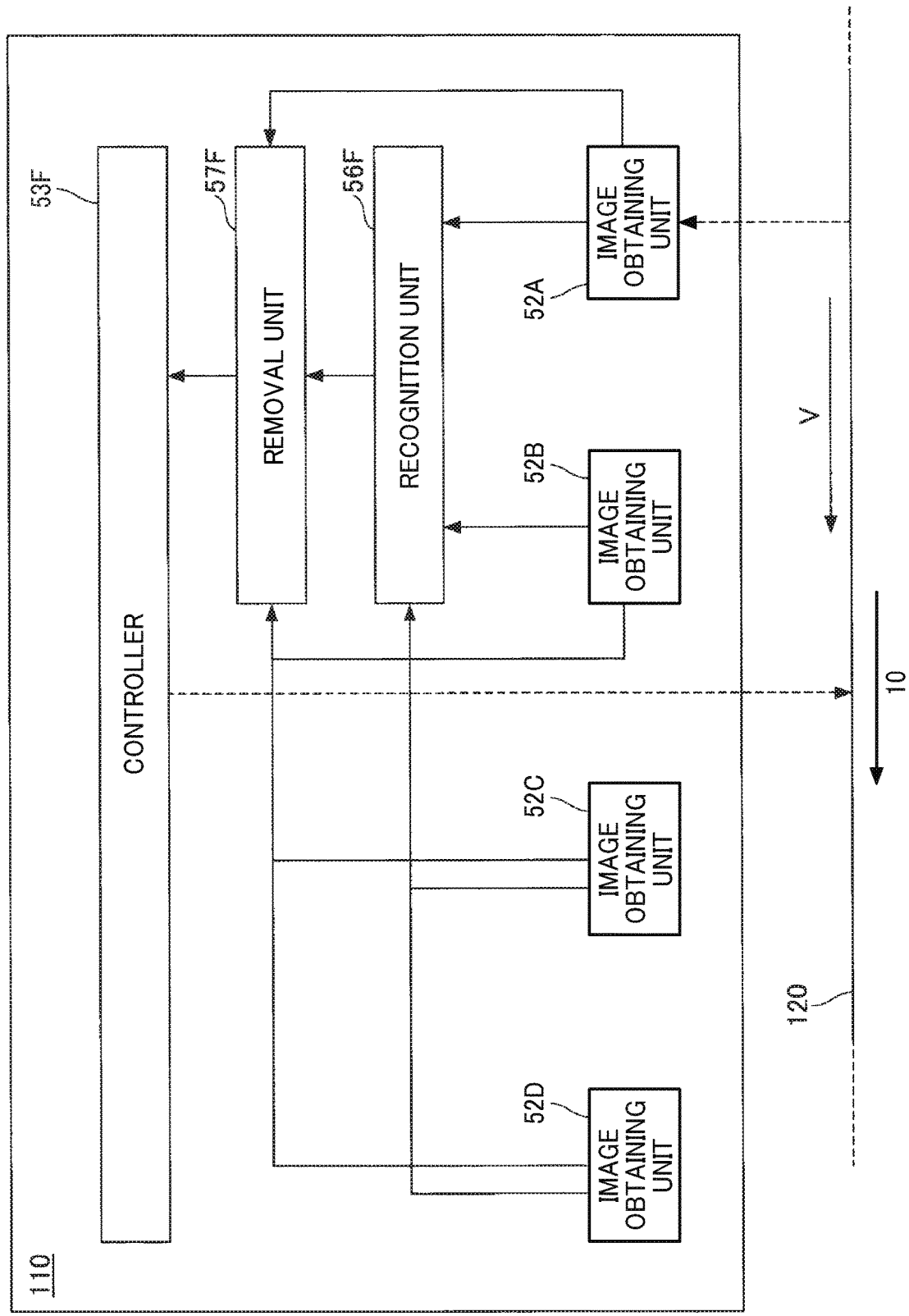
FIG. 24 is a schematic block diagram of a functional configuration of the conveyed object detector according to an embodiment.

FIG. 24 is a schematic block diagram of a functional configuration of the conveyed object detector 500. In the configuration illustrated in FIG. 24, the conveyed object detector 500 includes one image obtaining unit 52 (52A, 52B, 52C or 52D) for each of the plurality of liquid discharge head units 210. The conveyed object detector 500 further includes the calculator 53F, the recognition unit 56F, and the removal unit 57F.

In the example structure illustrated in FIG. 24, there are four image obtaining units 52 (equivalent to the image obtaining units 52A and 52B in FIG. 6). The image obtaining unit 52 detects the position of the web 120 (the recording medium) in either the conveyance direction 10 or the orthogonal direction 20. The image obtaining unit 52 is implemented by the sensor unit SEN illustrated in FIG. 5. The image obtaining unit 52 outputs, using an optical sensor, a detection result indicating the speed of movement of the conveyed object in at least one of the conveyance direction 10 and the orthogonal direction 20. The detection result includes the amount of movement in the conveyance direction 10 and the orthogonal direction 20.

For each liquid discharge head unit 210, one first roller CR1 is provided. In the example structure illustrated in FIG. 24, the number of the first rollers CR1 is four and identical to the number of the liquid discharge head units 210. The first roller CR1 is disposed upstream from each liquid discharge head unit 210 to convey the web 120 to the ink discharge position at which the liquid discharge head unit 210 discharges liquid. In the case of black, the first roller CR1K illustrated in FIG. 2 is the first roller CR1.

Further, for each liquid discharge head unit 210, the second roller CR2 is provided. In the example structure illustrated in FIG. 2, the number of the second rollers CR2 is four and identical to the number of the liquid discharge head units 210. The second roller CR2 is disposed downstream from each liquid discharge head unit 210 to convey the web 120 away from the ink discharge position. In the case of black, the second roller CR2K illustrated in FIG. 2 is the second roller CR2.

The recognition unit 56F recognizes an object adhering to the image obtaining unit 52 or the optical component used by the image obtaining unit 52. The detection method of the recognition unit 56F is described above with reference to FIGS. 13A, 13B, and 13C. The recognition unit 56F is implemented by, for example, an electronic circuit.

The removal unit 57F removes the adhering object from the image data generated by the image obtaining unit 52. The removal unit 57F is implemented by, for example, an electronic circuit.

The image forming apparatus 110 further includes a head moving device (e.g., the actuators AC1, AC2, AC3, and AC4) to move the liquid discharge head units 210 according to the detection results.

As described above, the image obtaining unit 52 (e.g., the sensor unit SEN) is disposed in the inter-roller range INT1 (NTY1, INTC1, INTM1, or INTY1) close to the ink discharge position (PK, PC, PM, or PY) to enhance the detection accuracy of the position of the recording medium in the conveyance direction 10 or the orthogonal direction 20.

More preferably, the image obtaining unit 52 (e.g., the sensor unit SEN) is disposed in the upstream range INTK2, INTC2, INTM2, or INTY2) upstream from the ink discharge position and downstream from the first roller CR1 in the conveyance direction 10 to enhance the detection accuracy.

As described above, the embodiments described above concern the conveyed object detector 500 and the liquid discharge apparatus (e.g., the image forming apparatus 110) including the conveyed object detector. The conveyed object detector 500 includes the image obtaining unit 52, the recognition unit 56F, and the removal unit 57F. The conveyed object detector 500 is configured to recognize an adhering object adhering such as stain on the optical system and remove the adhering object from the image data used in determining the position of the conveyed object. Then, the conveyed object detector 500 can detect the position of the conveyed object in either the conveyed direction 10 or the orthogonal direction 20 with a high accuracy.

According to one aspect of this disclosure, for each liquid discharge head unit, the liquid discharge apparatus includes the sensor unit (e.g., the sensor unit SEN) to detect the position of the conveyed object (in either the conveyance direction 10 or the orthogonal direction 20) at a position relatively close to the liquid discharge head unit. According to the detection result, the liquid discharge apparatus moves the liquid discharge head unit. In particular, in the liquid discharge apparatus, image quality is improved when the liquid discharge head unit is moved to eliminate the misalignment in droplet strike positions during image formation.

Accordingly, compared with Comparative examples 1 and 2 illustrated in FIGS. 20, 21, and 22, the liquid discharge apparatus according one aspect of this disclosure can suppress the misalignment in the droplet strike positions in the orthogonal direction 20.

Further, the image forming apparatus 110 illustrated in FIG. 2 is free of layout constraint required in Comparative example 1, that is, a requisite of setting the distance between the adjacent two liquid discharge head units to an integral multiple of the length of circumference of the driving roller. Thus, layout of the liquid discharge head units is more flexible in the structure illustrated in FIG. 2.

As the accuracy in droplet strike positions improves, misalignment in color superimposition is suppressed, improving image quality.

Variation

Figure 25:
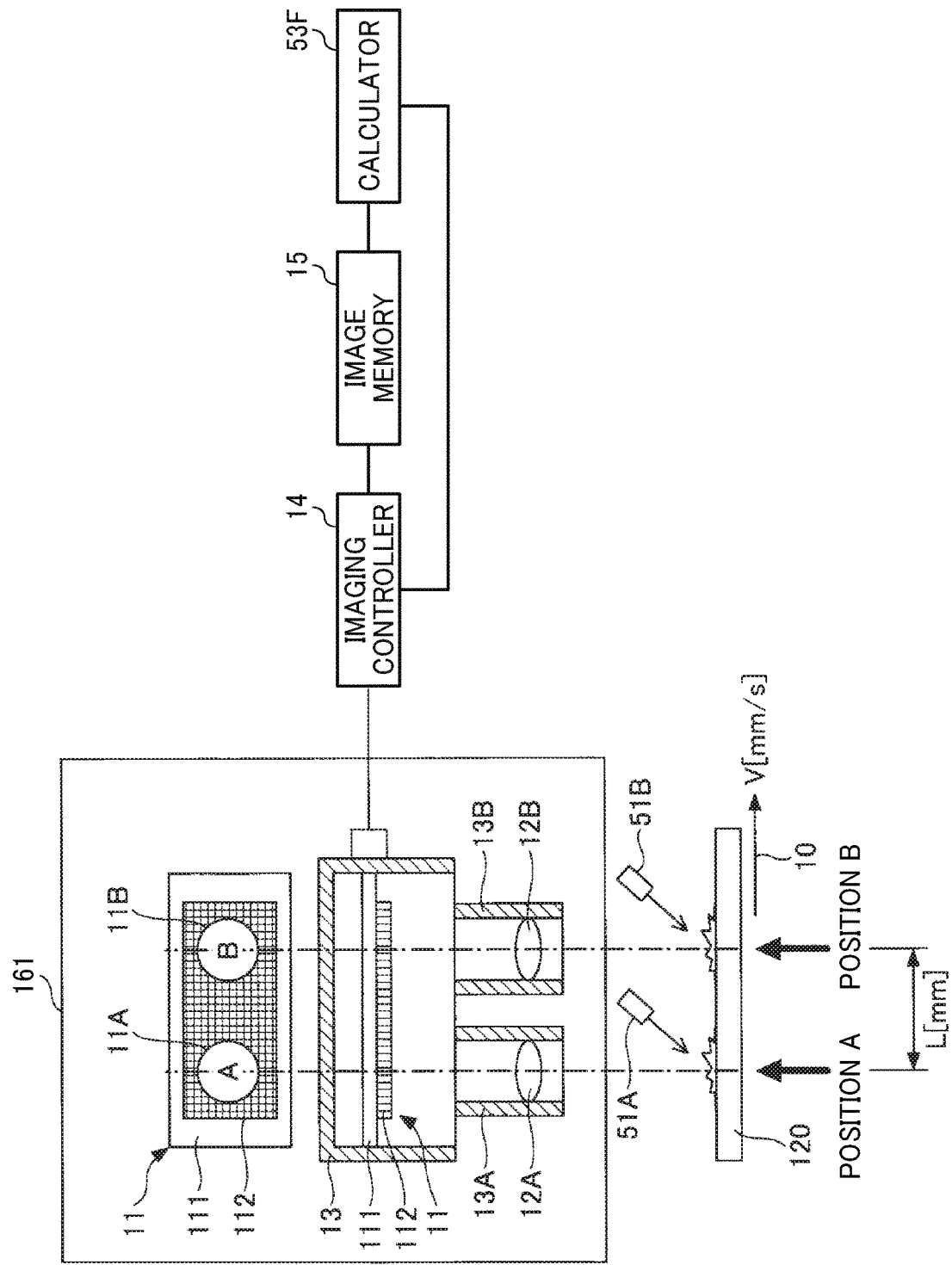
FIG. 25 is a schematic block diagram of a conveyed object detector according to Variation 1.

FIG. 25 is a schematic block diagram of the conveyed object detector 500 including an imaging unit 161 according to Variation 1. The imaging unit 161 is configured as if two imaging units 16 illustrated in FIG. 6 are combined therein. The imaging controller 14, the image memory 15, and the calculator 53F are similar to those illustrated in FIGS. 4 and 6.

The first light source 51A and the second light source 51B emit laser light or the like to the web 120, which is an example of the conveyed object to be detected. The first light source 51A irradiates a position A with light, and the second light source 51B irradiates a position B with light.

The light sources 51 are not limited to laser light sources but can be light emitting diodes (LEDs) or the like.

Each of the first light source 51A and the second light source 51B includes a light-emitting element to emit laser light and a collimator lens to approximately collimate the laser light emitted from the light-emitting element. The first light source 51A and the second light source 51B are disposed to emit light in an oblique direction relative to the surface of the web 120.

The imaging unit 161 includes the area sensor 11, the first imaging lens 121 disposed opposing the position A, and the second imaging lens 12B disposed opposing the position B.

The area sensor 11 includes an image sensor 112 on a silicon substrate 111. The image sensor 112 includes an area 11A and an area 11B, in each of which a two-dimensional image is captured. For example, the area sensor 11 is a CCD sensor, a complementary metal oxide semiconductor (CMOS) sensor, a photodiode array, or the like. The area sensor 11 is housed in a case 13. The first imaging lens 12A and the second imaging lens 12B are hold by first lens barrel 13A and a second lens barrel 13B, respectively.

In the illustrated structure, the optical axis of the first imaging lens 12A matches a center of the area 11A. Similarly, the optical axis of the second imaging lens 12B matches a center of the area 11B. The first imaging lens 12A and the second imaging lens 12B focus light on the area 11A and the area 11B, respectively, to generate two-dimensional images.

Figure 26:
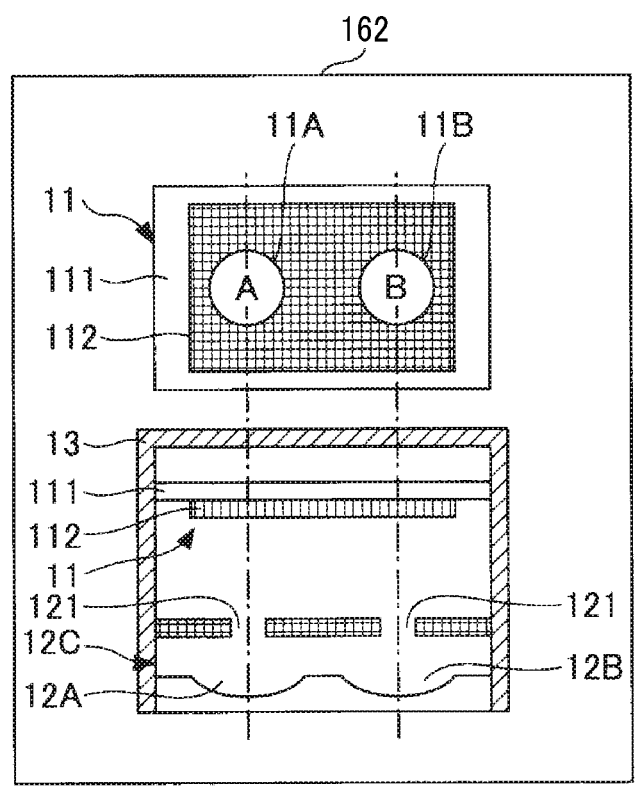
FIG. 26 is a schematic view of an imaging unit of the conveyed object detector according to Variation 2.

FIG. 26 is a schematic view of an imaging unit 162 according to Variation 2. Differently from the structure illustrated in FIG. 25, in the structure illustrated in FIG. 26, the first imaging lens 12A and the second imaging lens 12B are integrated into a lens 12C. The area sensor 11 and the like are similar in structure to those illustrated in FIG. 4.

Additionally, in this structure, use of aperture 121 or the like is preferable to prevent interference between the images generated by the first imaging lens 12A and the second imaging lens 12B. The aperture 121 or the like can limit a range in which each of the first imaging lens 12A and the second imaging lens 12B generates an image. Accordingly, the interference between the images are suppressed. Then, the imaging unit 162 can generate an image of the position A and an image of the position B illustrated in FIG. 26.

Figure 27A:
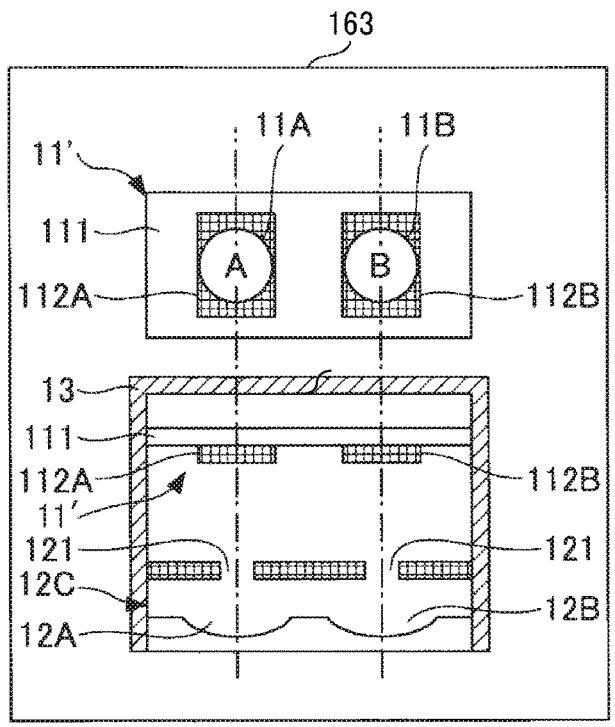
FIGS. 27A and 27B are schematic views of a conveyed object detector according to Variation 3.
Figure 27B:
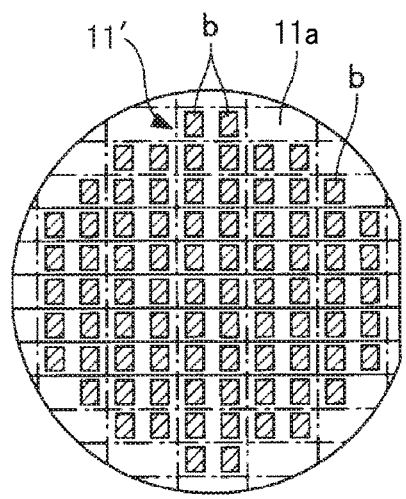

FIGS. 27A and 27B are schematic views of an imaging unit 163 according to Variation 3. Differently from the structure illustrated in FIG. 25, the imaging unit 163 illustrated in FIG. 27A includes an area sensor 11' instead of the area sensor 11. The first imaging lens 12A, the second imaging lens 12B, and the like are similar in structure to those illustrated in FIG. 5.

The area sensor 11' has a structure illustrated in FIG. 27B, for example. Specifically, as illustrated in FIG. 27B, a wafer 11a includes a plurality of image sensors b. The plurality of image sensors b illustrated in FIG. 27B is cut out of the wafer 11a. The plurality of image sensors b serves as a first image sensor 112A and a second image sensor 112B and disposed on the silicon substrate 111. The first imaging lens 12A and the second imaging lens 12B are disposed in accordance with the distance between the first image sensor 112A and the second image sensor 112B.

Image sensors are generally manufactured for imaging. Therefore, image sensors have an aspect ratio (ratio between X-direction size and Y-direction size), such as square, 4:3, and 16:9, that fits an image format. In the present embodiment, an image covering at least two different points spaced apart is captured. Specifically, an image is captured at each of points spaced apart in the X direction, one direction in two dimensions. The X direction corresponds to the conveyance direction 10 illustrated in FIG. 4. By contrast, the image sensor has an aspect ratio fit for the image format. Accordingly, when an image is captured at the two points spaced apart in the X direction, it is possible that an image sensor relating to the Y direction is not used. To enhance pixel density, an image sensor having a higher pixel density is used in either the X direction or the Y direction. In such a case, the cost increases.

In view of the foregoing, in the structure illustrated in FIG. 27A, on the silicon substrate 111, the first image sensor 112A and the second image sensor 112B spaced apart are disposed. This structure can reduce the number of unused image sensors of the image sensors relating to the Y direction. In other words, waste of image sensors is inhibited. Additionally, since the first image sensor 112A and the second image sensor 112B are produced through a semiconductor process with high accuracy, the distance between the first image sensor 112A and the second image sensor 112B is set with high accuracy.

Figure 28:
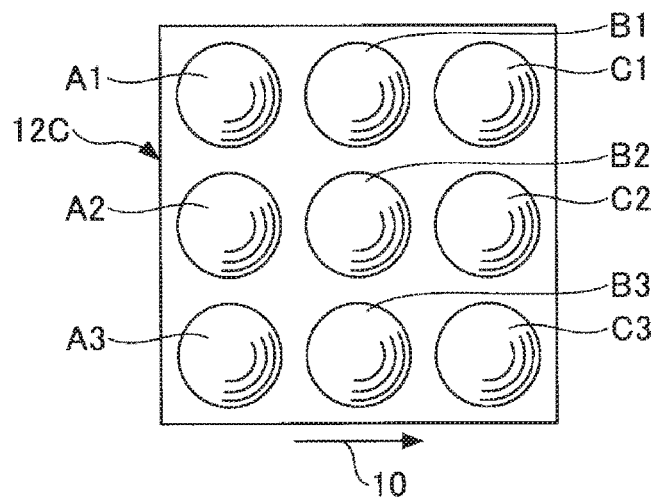
FIG. 28 is a schematic view of a plurality of imaging lenses used for the detecting the conveyed object, according to another variation.

FIG. 28 is a schematic view of a plurality of imaging lenses used in the imaging unit 16 according to another variation. The lens array illustrated can be used to implement the image obtaining unit 52.

In the lens array illustrated in FIG. 28, two or more lenses are integrated. Specifically, the lens array illustrated in FIG. 28 includes, for example, nine imaging lenses A1, A2, A3, B1, B2, B3, C1, C2, and C3 arranged in three rows and three columns. When such an lens array is used, an image including nine points is captured. In this case, an area sensor having nine imaging ranges is used.

In this structure, for example, arithmetic of the two imaging ranges can be performed concurrently, that is, in parallel. When the results of arithmetic of each range are averaged, or error is removed from the results, the accuracy and stability of arithmetic can be higher, compared with a case in which one arithmetic result is used. There are cases where the arithmetic is performed based on application software, the speed of which fluctuates. Even in such case, accurate result of arithmetic can be obtained since a range for performing correlation operation is expanded.

Referring back to FIG. 25, the imaging controller 14 controls the imaging unit 161 (or 162 or 163). Specifically, for example, the imaging controller 14 outputs signals to the imaging unit 161 to control the timing of shooting (shutter timing) of the area sensor 11. The imaging controller 14 causes the imaging unit 161 to generate the two-dimensional images and acquires the two-dimensional images therefrom. Then, the imaging controller 14 transmits the two-dimensional images to the image memory 15.

The image memory 15 is a so-called memory. The conveyed object detector 500 preferably has a capability to divide the two-dimensional images transmitted from the imaging controller 14 and storing the divided images in different memory ranges.

For example, the calculator 53F is a microcomputer. The calculator 53F performs operations using the image data stored in the image memory 15 and the like, to implement a variety of processing.

The imaging controller 14 and the calculator 53F are, for example, central processing units (CPUs) or electronic circuits. Note that the imaging controller 14, the image memory 15, and the calculator 53F are not necessarily discrete devices. For example, the imaging controller 14 and the calculator 53F can be implemented by a single CPU.

Figure 29:
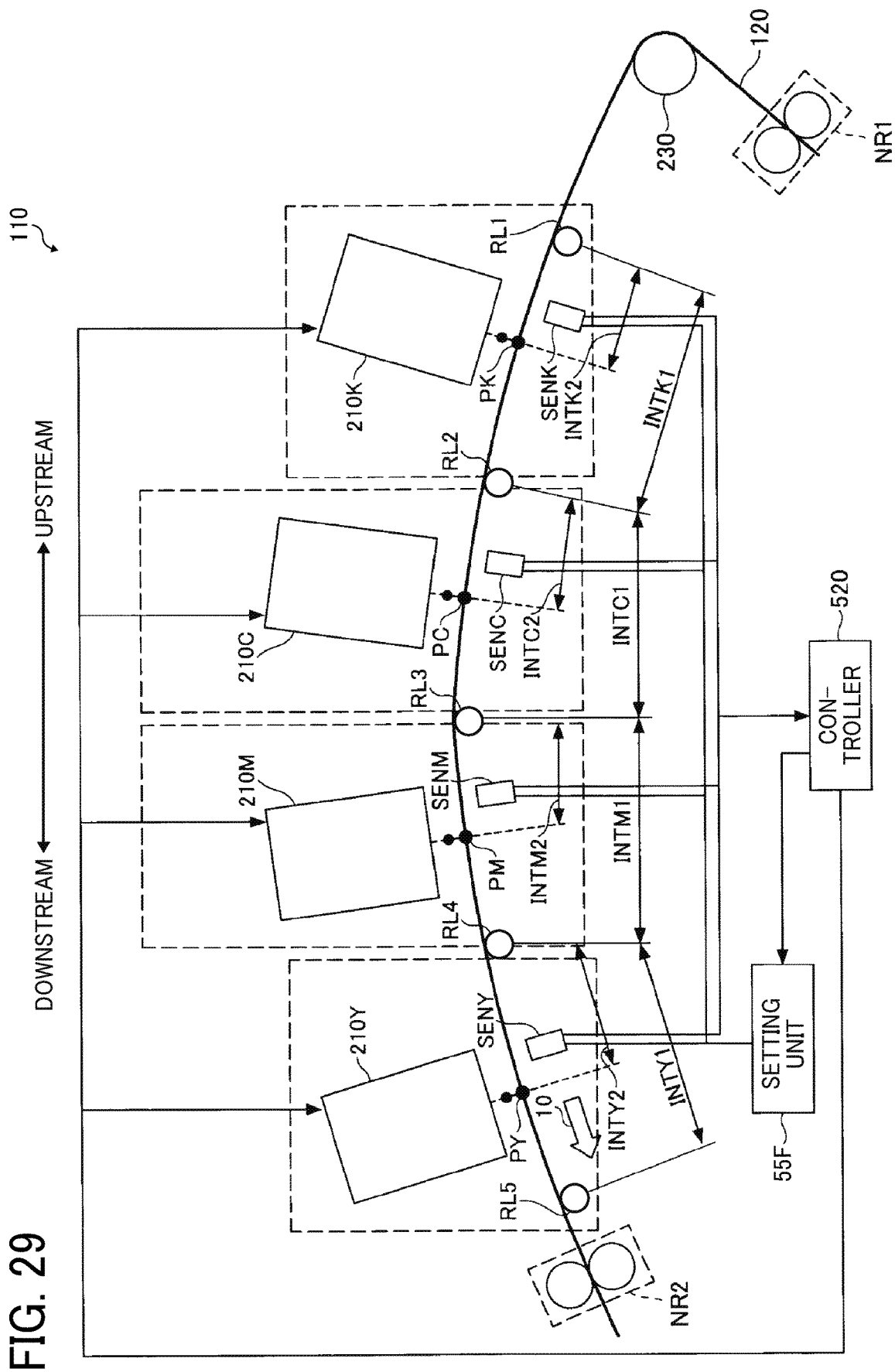
FIG. 29 is a schematic view of an image forming apparatus according to another variation.

FIG. 29 is a schematic view of the image forming apparatus 110 (e.g., a liquid discharge apparatus) according to a variation. The configuration illustrated in FIG. 29 differs from the configuration illustrated in FIG. 2 regarding the locations of the first support and the second support. The structure illustrated in FIG. 29 includes supports RL1, RL2, RL3, RL4, and RL5, serving as the first and second supports, to support the web 120. In other words, the second support (e.g., the conveyance roller CR2K in FIG. 2) disposed downstream from the upstream one of adjacent two head units also serves as the first support (e.g., the conveyance roller CR1C in FIG. 2) disposed upstream from the downstream one of the adjacent two head units. Note that, the support according to the variation, which doubles as the first and second supports, can be either a roller or a curved plate.

One or more of aspects of this disclosure can adapt to a liquid discharge system including at least one liquid discharge apparatus. For example, the liquid discharge head unit 210K and the liquid discharge head unit 210C are housed in one case as one device, and the liquid discharge head unit 210M and the liquid discharge head unit 210Y are housed in another case as another device. Then, the liquid discharge system includes the two devices.

Further, one or more of aspects of this disclosure can adapt a liquid discharge system to discharge liquid other than ink. For example, the liquid is a recording liquid of another type or a fixing solution.

The liquid discharge apparatus (or system) to which one or more of aspects of this disclosure is applicable is not limited to image forming apparatus to form two-dimensional images but can be apparatuses to fabricate three-dimensional articles.

The recording medium is not limited to recording sheets but can be any material to which liquid adheres, even temporarily. Examples of the material to which liquid adheres include paper, thread, fiber, cloth, leather, metal, plastic, glass, wood, ceramics, and a combination thereof.

Further, one or more of aspects of this disclosure is applicable to a method of discharging liquid from an image forming apparatus, an information processing apparatus, or a computer as a combination thereof, and at least a portion of the method can be implemented by a program.

Further, one or more of aspects of this disclosure can adapt to any configuration (in the form of apparatus, method, system, computer program, and computer program product) in which an apparatus performs an operation on a conveyed object or processing of the conveyed object, using a head to move in the direction orthogonal to the direction of conveyance of the conveyed object. For example, one or more of aspects of this disclosure can adapt to a configuration in which a laser head moves in the direction orthogonal to the direction of conveyance of a substrate being a conveyed object. The laser head performs laser patterning on the substrate extends, and the laser head is moved according to detection of position of the substrate.

The number of the head units is not necessarily to two or more. In other words, one or more of aspects of this disclosure can adapt to an apparatus configured to keep applying an object discharged from a head unit to a reference position. In the case of a laser device, the device is configured to keep writing on a reference position.

Any one of the above-described operations may be performed in various other ways, for example, in an order different from the one described above. Any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

What is claimed is:

1. A conveyed object detector comprising:
a first image obtaining unit disposed at a first position to image a conveyed object to obtain first image data corresponding to a plurality of images of the conveyed object before image formation and while the conveyed object is moving in a conveyance direction;
a second image obtaining unit disposed at a second position downstream from the first position in a conveyance direction of the conveyed object, the second image obtaining unit configured to image the conveyed object to obtain second image data corresponding to the plurality of images of the conveyed object before image formation and while the conveyed object is moving in a conveyance direction,
each of the first image obtaining unit and the second image obtaining unit including:
a light source to irradiate the conveyed object with light;
an area sensor to receive reflected light reflected from the conveyed object; and
an optical element disposed between the area sensor and the conveyed object;
a controller configured to, before image formation,
recognize an object adhering to the first image obtaining unit based on the obtained first image data to generate first stain data;
recognize an object adhering to the second image obtaining unit based on the obtained second image data to generate second stain data;
remove the first stain data from the first image data, to generate first corrected image data;
remove the second stain data from the second image data to generate second corrected image data; and
generate, as a calculation result, at least one of a position, a movement amount, and a moving speed of the conveyed object based on the first corrected image data and the second corrected image data.

2. The conveyed object detector according to claim 1, wherein the first image obtaining unit and the second image obtaining unit are configured to image a pattern on the conveyed object, and
wherein the controller is configured to generate the calculation result with reference to the pattern.

3. The conveyed object detector according to claim 2, wherein the pattern represents interference of the reflected light on a rugged shape of the conveyed object, and
the controller is configured to generate the calculation result based on an image of the pattern.

4. The conveyed object detector according to claim 2, wherein the first image obtaining unit is configured to image the pattern at a first time point to obtain the first image data, wherein the second image obtaining unit is configured to image the pattern at a second time point different from the first time point, to obtain the second image data, and
wherein the controller is configured to calculate a position of the conveyed object in an orthogonal direction orthogonal to the conveyance direction, based on the first corrected image data and the second corrected image data.

5. The conveyed object detector according to claim 1, wherein the controller is configured to:
superimpose a plurality of image data output by the first image obtaining unit to generate the first stain data; and
superimpose a plurality of image data output by the second image obtaining unit to generate the second stain data.

6. A conveyance device comprising:
a conveyor to convey the conveyed object; and
the conveyed object detector according to claim 1.

7. An apparatus comprising:
a head unit to move in an orthogonal direction orthogonal to the conveyance direction and perform an operation on the conveyed object;
the conveyance device according to claim 6; and
a head controller to control the head unit, based on the calculation result generated by the conveyed object detector.

8. The apparatus according to claim 7, further comprising:
a first support disposed upstream from the head unit in the conveyance direction; and
a second support disposed downstream from the head unit in the conveyance direction,
wherein one of the first image obtaining unit and the second image obtaining unit is disposed between the first support and the second support in the conveyance direction.

9. The apparatus according to claim 8, wherein the image obtaining unit is disposed between the head unit and the first support in the conveyance direction.

10. The apparatus according to claim 7, further comprising a head moving device to move the head unit in the orthogonal direction.

11. The apparatus according to claim 7, wherein the head controller is configured to determine a position of the head unit based on the calculation result generated by the conveyed object detector.

12. The apparatus according to claim 7, wherein the conveyed object is a continuous sheet.

13. The apparatus according to claim 7, wherein the head unit includes a liquid discharge head to perform, as the operation, image formation on the conveyed object.

14. A conveyed object detector comprising:
image obtaining means for imaging a conveyed object at a first position and at a second position downstream from the first position before image formation and to obtain first image data and second image data, respectively, the second position different from the first position in a conveyance direction of the conveyed object;
recognition means for recognizing, before image formation,
an adhering object based on imaging at the first position to generate first stain data; and
an adhering object based on imaging at the second position to generate second stain data;
removal means for removing the first stain data from the first image data to generate first corrected image data and removing the second stain data from the second image data to generate second corrected image data; and calculating means for generating, as a calculation result, at least one of a position, a movement amount, and a moving speed of the conveyed object based on the first corrected image data and the second corrected image data.

15. A conveyed object detecting method comprising:

imaging, with a first area sensor and a second area sensor, a conveyed object at a first position and a second position downstream from the first position to obtain first image data and second image data before image formation, respectively, the second position different from the first position in a conveyance direction of the conveyed object;

recognizing, before image formation, an adhering object adhering to the first area sensor based on imaging at the first position, to generate first stain data;

recognizing, before image formation, an adhering object adhering to the second area sensor based on imaging at the second position, to generate second stain data;

removing the first stain data from the first image data, to generate first corrected image data;

removing the second stain data from the second image data, to generate second corrected image data; and generating, as a calculation result, at least one of a position, a movement amount, and a moving speed of the conveyed object based on the first corrected image data and the second corrected image data.

16. A computer-readable non-transitory recording medium storing a program for causing a computer to execute the method according to claim 15.

* * * * *